United States Patent
Wozniak et al.

(10) Patent No.: US 12,129,934 B2
(45) Date of Patent: Oct. 29, 2024

(54) PORTABLE VALVE OPERATING DEVICE FOR USE IN EXERCISING VALVES

(71) Applicant: ILLINOIS TOOL WORKS, INC., Glenview, IL (US)

(72) Inventors: Mark W. Wozniak, Cary, IL (US); Michael W. Gearhart, Schaumburg, IL (US); Karl G. Kopija, Joliet, IL (US); Ramunas Jonaitis, Naperville, IL (US); Kenneth R. Pierce, Arlington Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 198 days.

(21) Appl. No.: 17/480,552

(22) Filed: Sep. 21, 2021

(65) Prior Publication Data
US 2022/0243838 A1     Aug. 4, 2022

Related U.S. Application Data

(63) Continuation-in-part of application No. 17/175,022, filed on Feb. 12, 2021.
(Continued)

(51) Int. Cl.
*F16K 31/04*     (2006.01)
*B25B 21/00*     (2006.01)
(Continued)

(52) U.S. Cl.
CPC .......... *F16K 31/047* (2013.01); *B25B 21/002* (2013.01); *B25B 23/147* (2013.01); *E03B 7/09* (2013.01)

(58) Field of Classification Search
CPC .... F16K 31/04; F16K 31/048; F16K 37/0075; F16K 37/0083; F16K 31/047;
(Continued)

(56) References Cited

U.S. PATENT DOCUMENTS 1,979,340 A * 11/1934 Norman ................ B25B 21/002
                                                              290/51
4,994,001 A     2/1991 Wilkinson et al.
(Continued)

FOREIGN PATENT DOCUMENTS

| DE | 34 12 032 A1 | 12/1984 |
| DE | 20 2012 008347 U1 | 9/2012 |
| EP | 3 275 596 A1 | 1/2018 |

OTHER PUBLICATIONS

International Search Report for International Patent Application No. PCT/US2021/018021 dated Jun. 9, 2021, 5 pages.
(Continued)

*Primary Examiner* — Matthew W Jellett
(74) *Attorney, Agent, or Firm* — Klintworth & Rozenblat IP LLP

(57) ABSTRACT

A valve operating device includes a defining a transverse axis extending from a first end to a second end. A motor is positioned within the housing. The motor includes a motor output shaft configured to drive at least one gear disposed within the housing. The at least one gear is configured to rotate a key extending substantially perpendicular to the transverse axis to engage a valve. A motor controller unit drives the motor in either a clockwise or a counter-clockwise direction at a variable motor speed to deliver up to a torque limit. A user interface comprises a first motor activation throttle configured to drive the motor in the clockwise direction at a user-controlled speed when activated. A second motor activation throttle drives the motor at a user-controlled speed in the counter-clockwise direction when activated.

20 Claims, 17 Drawing Sheets

Related U.S. Application Data

(60) Provisional application No. 62/976,425, filed on Feb. 14, 2020, provisional application No. 62/976,848, filed on Feb. 14, 2020, provisional application No. 62/976,405, filed on Feb. 14, 2020.

(51) Int. Cl.
*B25B 23/147* (2006.01)
*E03B 7/09* (2006.01)

(58) Field of Classification Search
CPC ... F16K 31/53; F16H 1/28; E03B 7/09; B25B 21/002; B25B 23/147
See application file for complete search history.

(56) References Cited

U.S. PATENT DOCUMENTS

| | | | |
|---|---|---|---|
| 5,339,239 A | 8/1994 | Manabe et al. | |
| 5,361,996 A | 11/1994 | Svensson et al. | |
| 5,381,996 A | 1/1995 | Arnemann et al. | |
| 5,570,581 A | 11/1996 | Preston | |
| 5,810,051 A * | 9/1998 | Campagna | E03B 9/00 251/59 |
| 6,125,868 A * | 10/2000 | Murphy | F16K 31/46 702/41 |
| 6,282,989 B1 | 9/2001 | Sorter | |
| 7,334,606 B1 | 2/2008 | Hurley | |
| 7,415,376 B1 * | 8/2008 | Hurley | F16K 37/0091 702/182 |
| 7,604,023 B2 | 10/2009 | Buckner et al. | |
| 7,703,473 B1 | 4/2010 | Hurley | |
| 7,886,766 B2 | 2/2011 | Radomsky et al. | |
| 8,864,101 B1 | 10/2014 | Buckner | |
| 9,140,370 B2 * | 9/2015 | Kannoo | F16K 11/074 |
| 11,326,706 B2 | 5/2022 | Pierce et al. | |
| 2004/0045414 A1 | 3/2004 | Reuschel | |
| 2009/0267010 A1 | 10/2009 | Ferrar | |
| 2012/0138830 A1 | 6/2012 | Ferrar et al. | |
| 2017/0067575 A1 | 3/2017 | Preston | |
| 2018/0215019 A1 | 8/2018 | Hooks | |
| 2020/0230827 A1 | 7/2020 | Wozniak et al. | |
| 2022/0243838 A1 | 8/2022 | Wozniak et al. | |

OTHER PUBLICATIONS

Written Opinion for International Patent Application No. PCT/US2021/018021 dated Jun. 9, 2021, 5 pages.
Machine Translation of DE 3412032 A1.
Machine Translation of DE 202012008347 U1.
International Search Report and Written Opinion for International Patent Application No. PCT/US2021/017764 dated Jun. 25, 2021, 9 Pages.
International Search Report and Written Opinion for International Patent Application No. PCT/US2021/017774 dated Aug. 6, 2021, 9 Pages.
International Search Report and Written Opinion for International Patent Application No. PCT/US2021/018024 dated Aug. 2, 2021, 13 Pages.

* cited by examiner

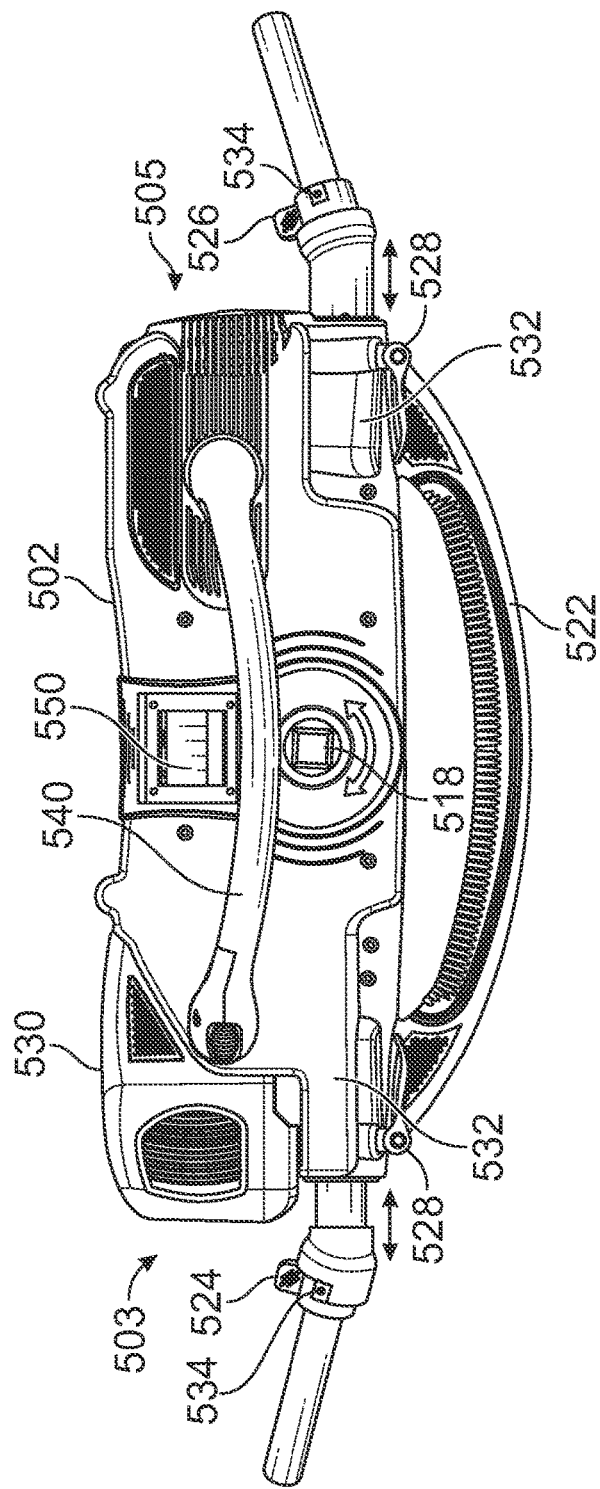
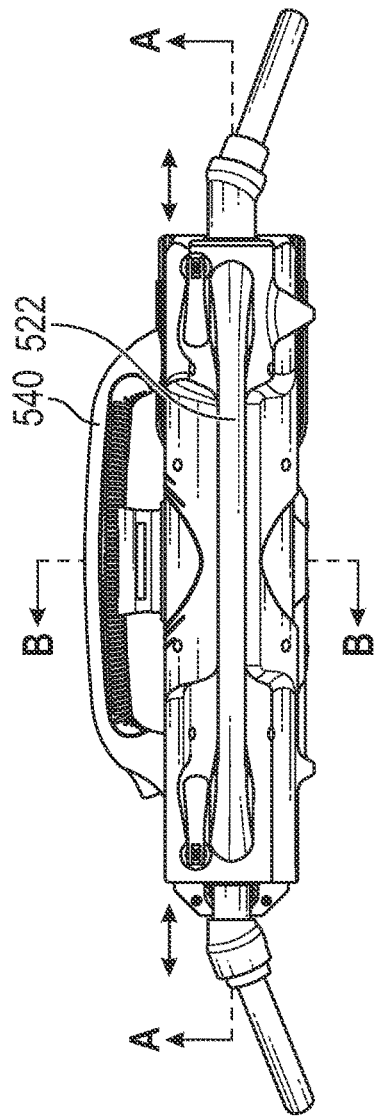
FIG. 6A
FIG. 6B

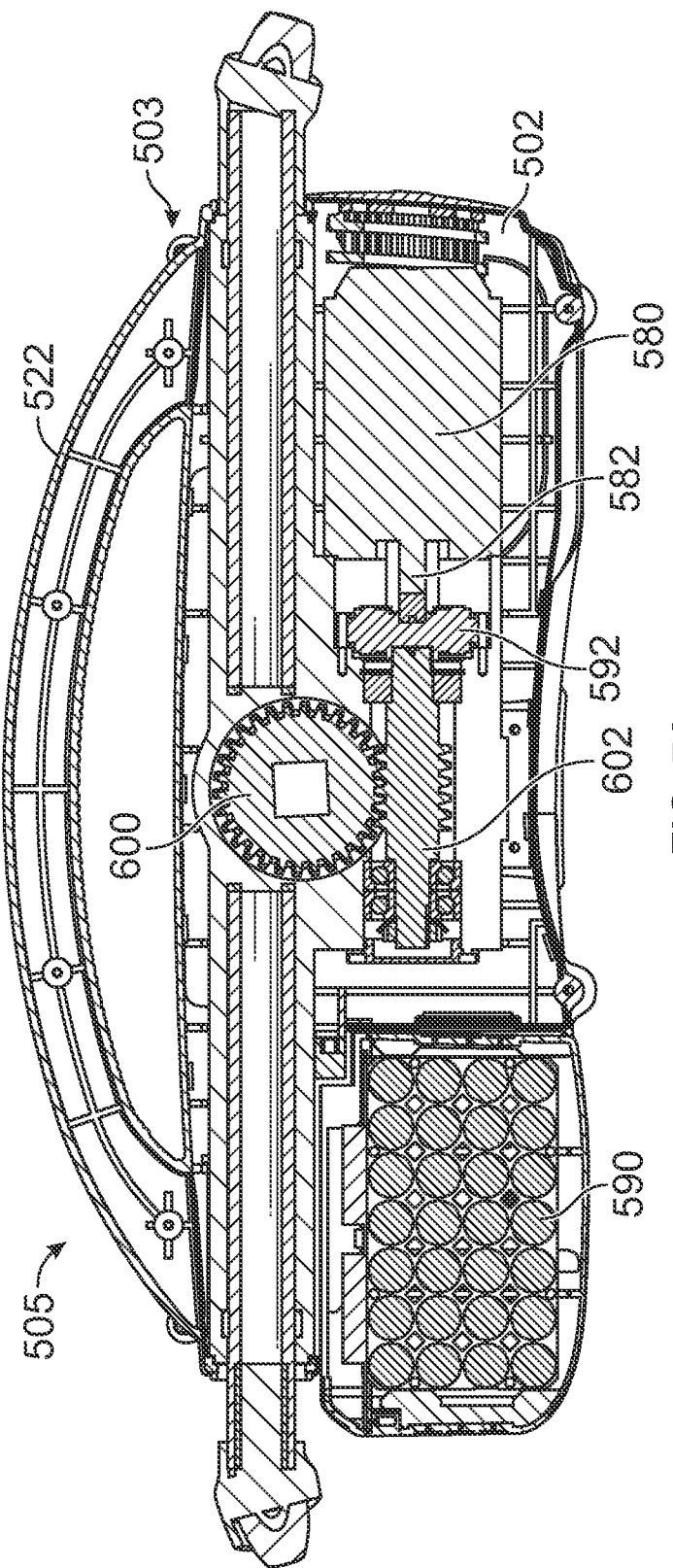

PORTABLE VALVE OPERATING DEVICE FOR USE IN EXERCISING VALVES

PRIORITY CLAIM AND INCORPORATION BY REFERENCE

This application claims priority as a Continuation-in-Part application of U.S. patent application Ser. No. 17/175,022, filed on Feb. 12, 2021, the contents of which are incorporated herein in their entirety.

This application also claims priority to:
1. Portable Valve Operating Device for Use in Exercising Valves, U.S. Provisional Patent Application Ser. No. 62/976,848, filed on Feb. 14, 2020, filed as a provisional application on the same date as the provisional application to which priority is claimed.
2. Portable Valve Operating Device for Use in Exercising Valves, U.S. Provisional Patent Application Ser. No. 62/976,405, filed on Feb. 14, 2020, filed as a provisional application on the same date as the provisional application to which priority is claimed.
3. Portable Valve Operating Device for Use In Exercising Valves Having A Torque Management System, U.S. Provisional Patent Application Ser. No. 62/976,425, filed as a provisional application on the same date as the provisional application to which priority is claimed.

FIELD OF THE INVENTION

The present disclosure generally relates to exercising valves.

BACKGROUND

Municipalities and the like have extensive networks of piping to control the flow of water from storage and pumping stations to users. The network of piping includes numerous valves such that portions of the network can be closed off as needed for service while the remainder of the network remains in operation. The piping required for such networks can range in size from as small as three or four inches in diameter to as large as three feet in diameter. Also, the valves of the system typically remain in an open condition or in a closed condition for very long periods of time.

The valves of a municipal water system are located below ground with an access shaft extending from the valve stem to the surface through which an elongate key is extended to turn the stem. Such valves typically include a screw that is rotatable through one hundred turns or more to fully open or fully close the valve. Also, underground valves undergo a certain degree of deterioration over time and it is common for valves to become frozen or locked into their current position as a result of contamination on the surface of the screw or deterioration of the parts. As a result, the large amount of torque needed to open and close such valves is provided by a motorized valve turning machine. Such machines are heavy and awkward and when operated apply a great amount of torque to the key that extends down a shaft to the valve stem for rotating the valve. Accordingly, to aid in the operation of such valve turning machines, it is common to mount such valve turning machines on an arm attached to a vehicle such as, for example, a truck or trailer.

Currently available valve exercising devices tend to be difficult and cumbersome to use in the field. The user interface is typically located separate from the machine and an operator is typically required to perform a substantial number of steps to configure the machine for operation and data transfer.

In addition, the configuration of typical valve exercising devices do not easily allow a user to react to valves that are particularly sticky. For example, valve exercising devices typically extend lengthwise from a key drive mechanism disposed at an end of the tool. When a valve is stuck, the operator may need to repeatedly switch directions of the rotation of the key drive-in order to release the valve. Current configurations require the operator to switch to opposite sides of the tool when switching directions of the key drive to counter a reaction force generated away from the operator. In some cases, the tool may suddenly move out of the operator's hold of the tool when switching directions of the key drive creating a substantial safety risk.

SUMMARY

The present disclosure is defined by the claims below. Nothing in this section should be taken as a limitation on those claims.

In one aspect, a portable valve operating device for use in exercising valves is provided. An example portable valve operating device may include a housing defining a transverse axis extending from a first end to a second end. A motor is disposed within the housing. The motor includes a motor output shaft configured to drive at least one gear disposed within the housing. The at least one gear is configured to rotate a key extending substantially perpendicular to the transverse axis to engage a valve. A motor controller unit is configured to drive the motor in either a clockwise or a counter-clockwise direction at a variable motor speed. A user interface includes a first motor activation throttle configured to drive the motor in the clockwise direction at a user-controlled speed when activated and a second motor activation throttle configured to drive the motor at a user-controlled speed in the counter-clockwise direction when activated.

In another aspect, the valve operating device includes an output socket disposed between the first end and the second end of the housing. The output socket is configured to receive an end of the key for engagement with the at least one gear.

In another aspect, the housing includes a key opening substantially aligned with the output socket and extending to a top surface of the housing. The key opening provides a view for an operator in aligning the key to the output socket.

In another aspect, the output socket includes a beveled edge at a receiving end of the output socket. The beveled edge is configured to form an inwardly directed cone section to substantially guide the end of the key to align the end of the key with the at least one gear when the key is inserted into the output socket.

In another aspect, the output socket is disposed substantially in a central portion of the housing.

In another aspect, the first motor activation throttle is mounted on the first end of the housing and the second motor activation throttle is mounted on the second end of the housing.

In another aspect, the valve operating device includes a first handle formed on the first end of the housing and a second handle formed on the second end of the housing.

In another aspect, the first motor activation throttle is mounted in proximity to the first handle and the second motor activation throttle is mounted in proximity to the second handle.

In another aspect, the first handle is mounted on the side of the housing at which the first motor activation throttle creates a reaction force that pulls the first handle away from a hand of the user holding the first handle when the user operates the first motor activation throttle.

In another aspect, the second handle is mounted on the side of the housing at which the second motor activation throttle creates a reaction force that pulls the second handle away from a hand of the user holding the second handle when the user operates the second motor activation throttle.

In another aspect, the first handle is configured to extend outward to an extended state from a first handle space disposed in the first end of the housing to receive the first handle in a non-extended state. The second handle is configured to extend outward to an extended state from a second handle space disposed in the second end of the housing to receive the second handle in a non-extended state.

In another aspect, the at least one gear includes a first gear and a second gear. The motor is mounted within the housing between the output socket and either the first end or the second end of the housing. A motor drive shaft extends from the motor to engage with the first gear. The first gear engages to rotate the second gear. The second gear engages with the key when the key is inserted in the output socket such that the key rotates in response to rotation of the second gear.

In another aspect, the first gear is a worm portion of a worm gear set and the second gear is a worm wheel portion of the worm gear set. The worm wheel includes a key opening to engage with the key when the key is inserted into the key opening.

In another aspect, the motor drive shaft is coupled to the motor and the worm gear via a planetary gear system configured to adjust a gear ratio of the worm gear and worm wheel.

In another aspect, the motor engages with the worm gear set to rotatably lock when the motor is switched to an off-state such that the operator is permitted to turn the key by manual rotation of the housing using a pair of handles mounted on opposite ends of the housing.

In another aspect, the valve operating device further comprises a battery removably mounted between the output socket and the other one of the second end or the first end opposite the motor.

In another aspect, the valve operating device further comprises at least one warning light mounted on the valve operating device to flash a light when the valve operating device is being used.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 6A is a top view of the valve operating device in FIG. 5A.

FIG. 6B is a zoomed in front view of the valve operating device in FIG. 5A.

FIG. 7A is a bottom cross-section view of the valve operating device in FIG. 6B along section A-A in FIG. 6B.

DETAILED DESCRIPTION

Figure 1:
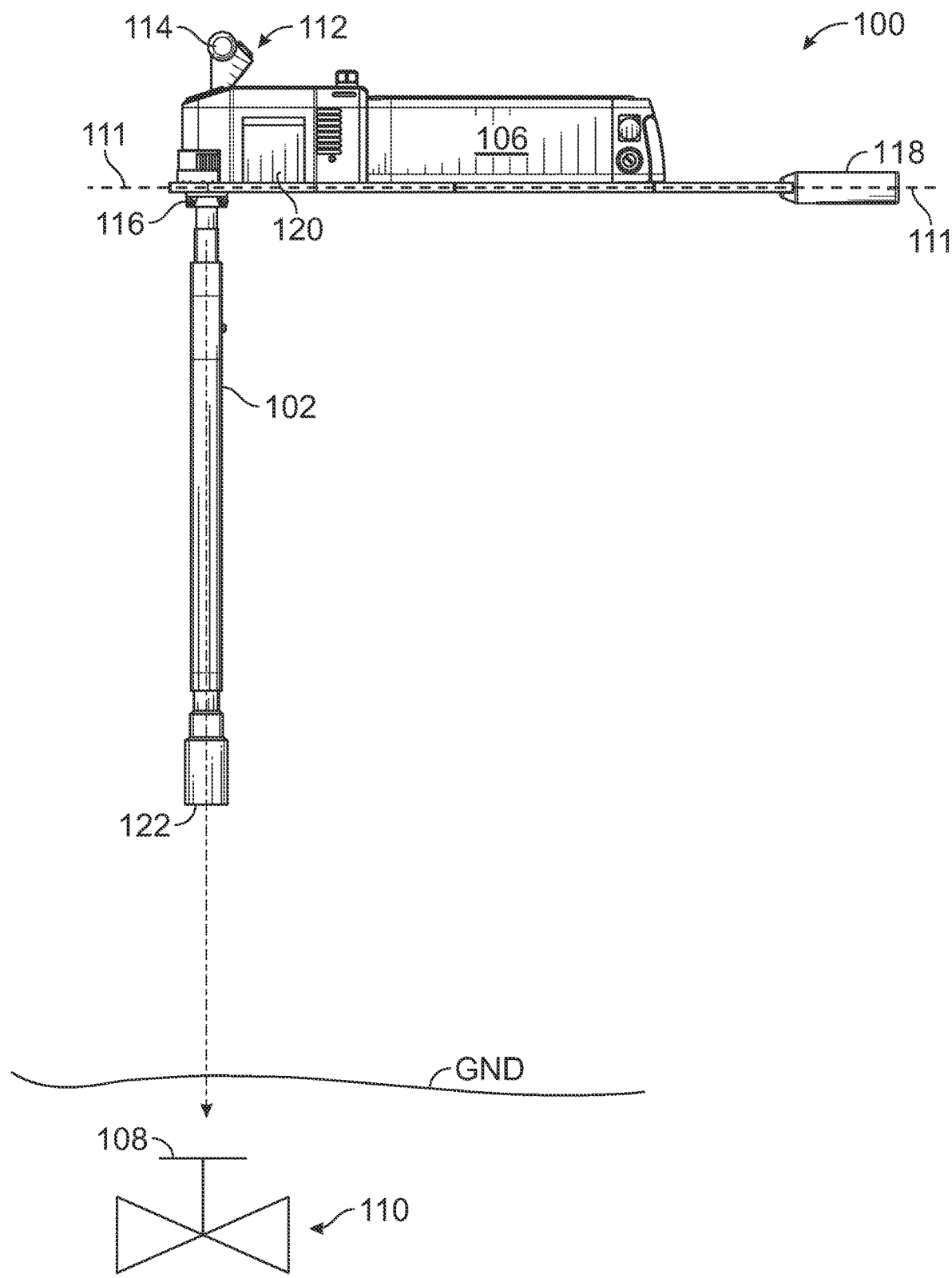
FIG. 1 is a side view of an example implementation of a valve operating device disposed above a valve to be exercised.

FIG. 1 is a side view of an example implementation of a valve operating device 100 disposed above a valve 110 to be exercised. The valve operating device 100 includes a key 102, a battery 106, a first handle 118, a second handle 114, an output socket 116, and a housing 120 mounted on a base 115 defining a central axis extending from a first end to a second end. The key 102 is configured to removably attach to the output socket 116 on the valve operating device 100. The output socket 116 is configured to mate with a top end of the key 102 such that the key 102 turns when the valve operating device 100 is activated. The key 102 is turned by a motor (described in more detail below with reference to FIG. 3) disposed in the housing 120. A bottom end 122 of the key 102 is configured to engage with a valve opening or closing mechanism 108 on the valve 110. The valve opening or closing mechanism 108 may be a screw that is rotatable through one hundred turns or more to fully open or fully close the valve 110. The valve opening or closing mechanism 108 may include a bolt head shaped protrusion, a bolt head shaped recess, or other suitable forms to enable the key 102 with a bottom end 122 having a compatible shape to turn the valve opening or closing mechanism 108.

In use, an operator holds the valve operating device 100 with the key 102 attached over the valve opening or closing mechanism 108. The operator lowers the valve operating device 100 to engage with the valve opening or closing mechanism 108. The operator then actuates a motor activation switch 112 to turn the key 102, which then turns the valve opening or closing mechanism 108. The operator may switch the motor to turn forward or in reverse through the extent of travel of the valve opening or closing mechanism 108 to fully open and fully close the valve 110. The operator may also use functions available via a graphical user interface on a display device on the housing 120 to select data to store for the valve 110.

Figure 2:
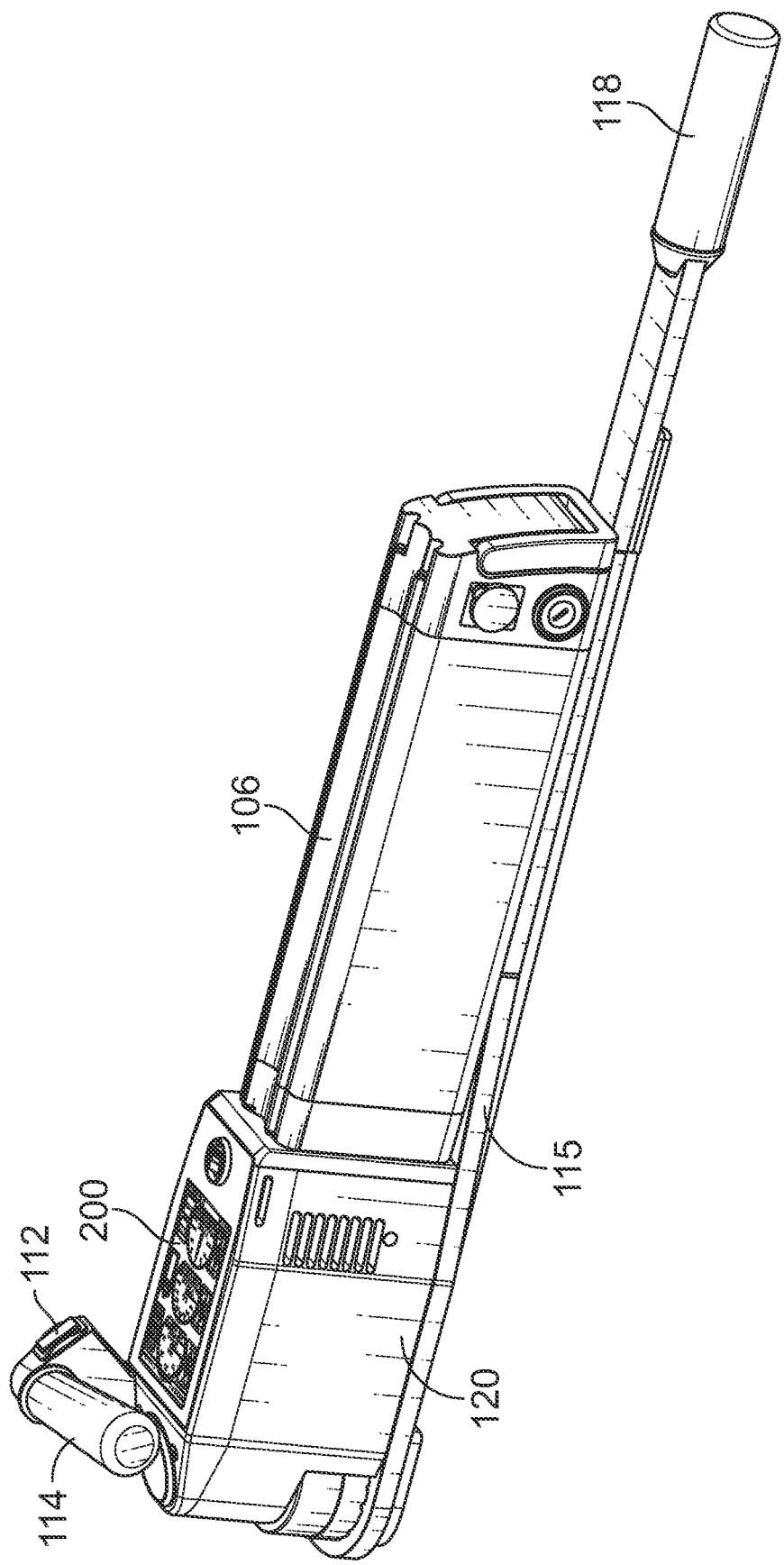
FIG. 2 is an isometric view of the example valve operating device.

FIG. 2 is an isometric view of the example valve operating device 100. The valve operating device 100 in FIG. 2 includes a display device 200 mounted on a top portion of the housing 120. The display device 200 is strategically mounted on the housing 120 proximal to the upwardly extending second handle 114. The second handle 114 is positioned adjacent to the motor activation switch 112 to allow the operator to easily reach the motor activation switch 112 during operation. The proximity of the display device 200, which includes screen buttons to enable actuation of the functions available to the valve operating device 100, to the second handle 114 and the motor activation switch 112 puts the functions of the valve operating device 100 within easy reach during operation.

Figure 3:
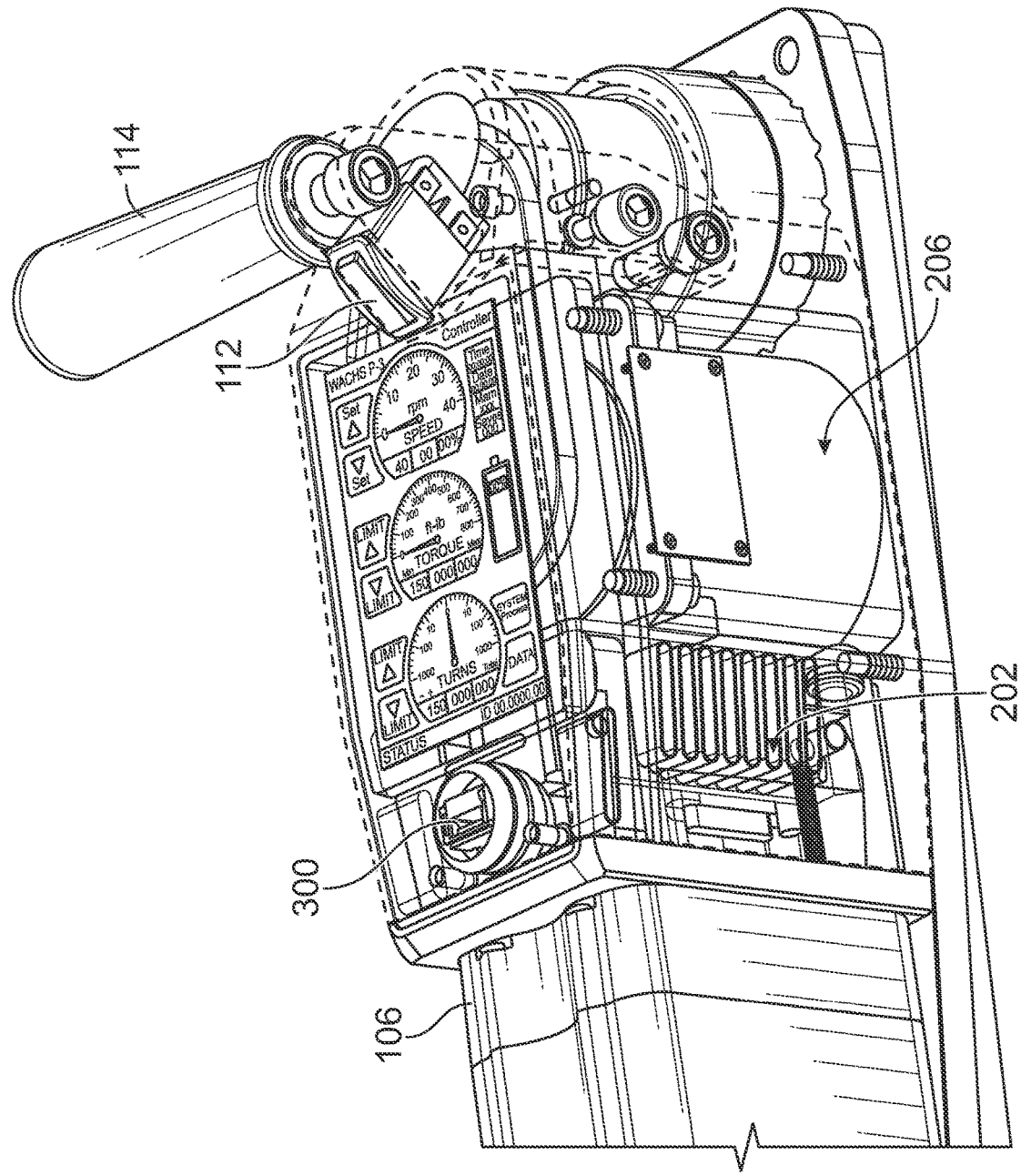
FIG. 3 is a transparent isometric view of a front portion of the example valve operating device.
Figure 4:
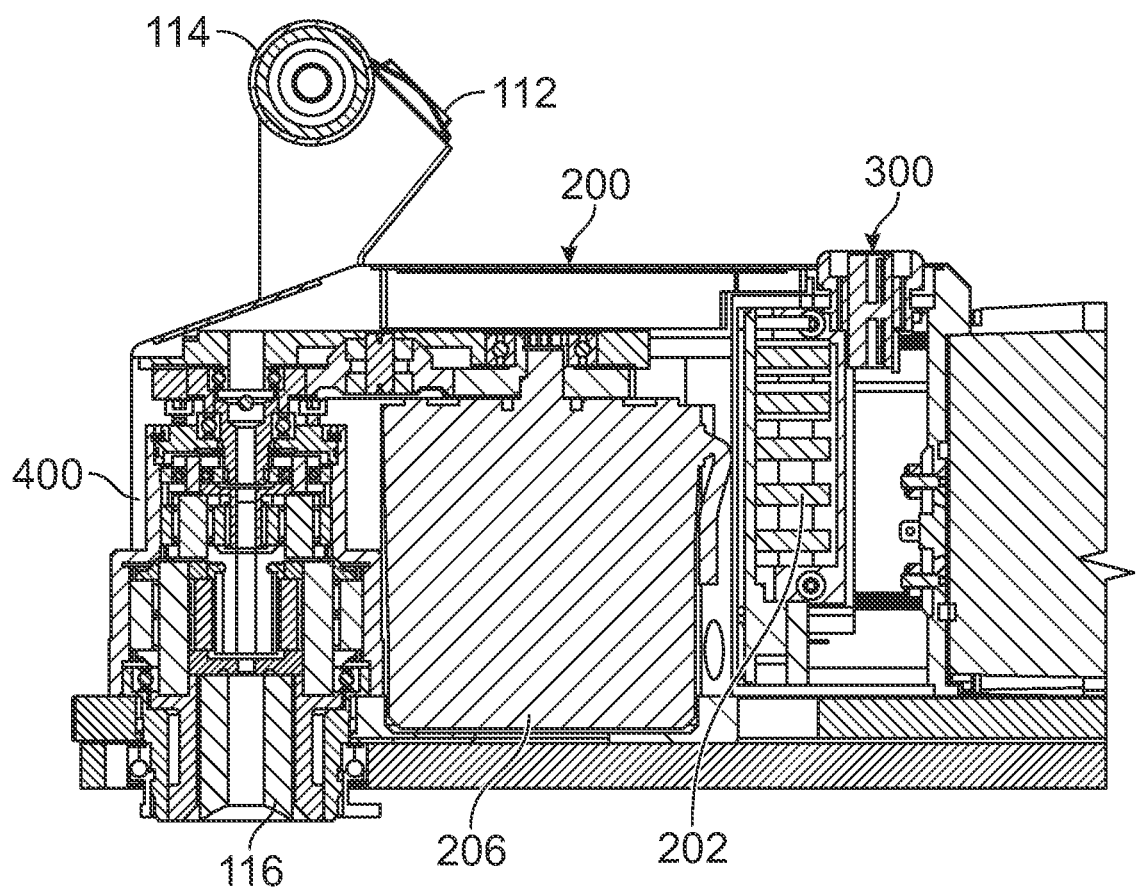
FIG. 4 is a side transparent elevational view of the front portion of the valve operating device.

FIG. 3 is a transparent isometric view of a front portion of the example valve operating device 100. FIG. 4 is a side transparent elevational view of the front portion of the valve operating device. Referring to FIGS. 3 and 4, the display device 200, the motor activation switch 112, and the handle 114 are shown in close proximity to one another at a front portion of the valve operating device 100. A data networking interface 300 is disposed below or behind the display device 200. A motor 206 is enclosed in the housing 120 below the display device 200 and behind a planetary gear module 400. The operator actuates the motor 206 to turn the gear system disposed in the planetary gear module 400. The gears couple to the output socket 116 to turn the key 102 when the key 102 (in FIG. 1) is engaged. Control modules 202 for operating the valve operating device 100 are enclosed in the housing 120 in a space behind the motor 206. In an example implementation, the control modules 202 include a motor controller unit, a human-machine interface controller, and a data networking interface module.

Figure 5A:
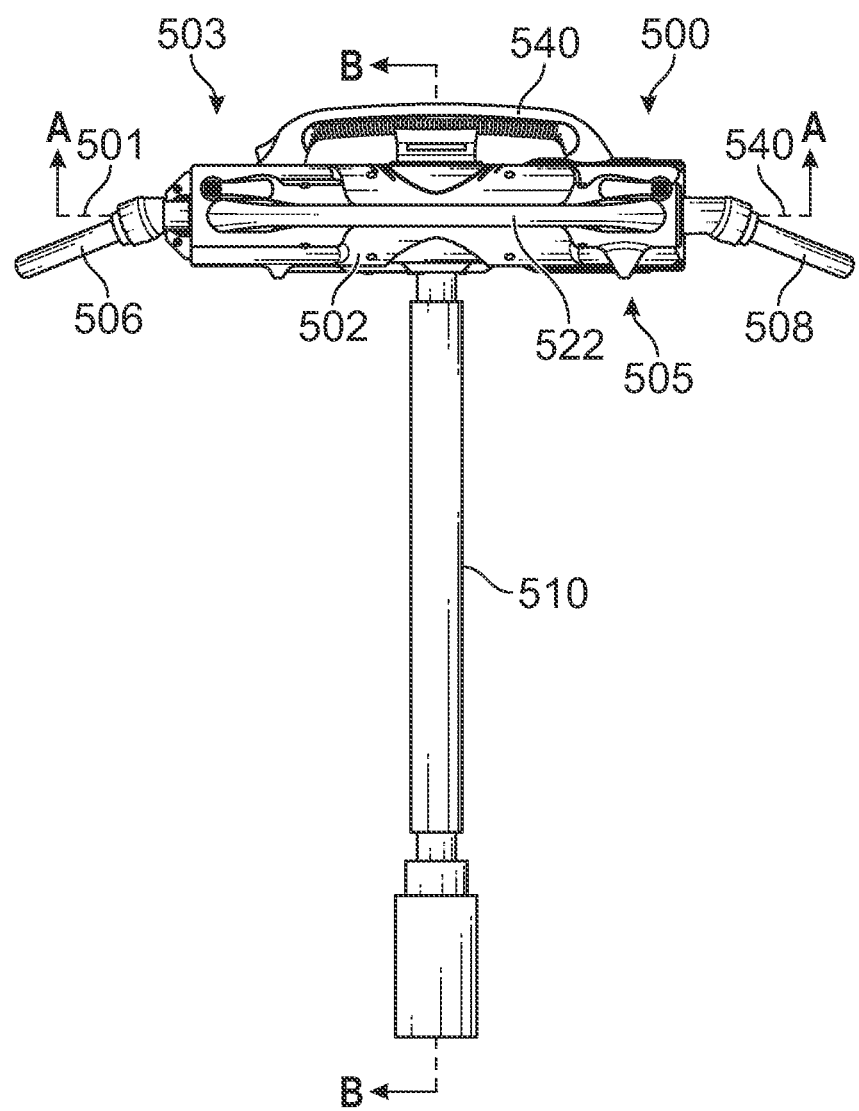
FIG. 5A is a front view of another example implementation of a valve operating device connected to a valve turning tool.
Figure 5B:
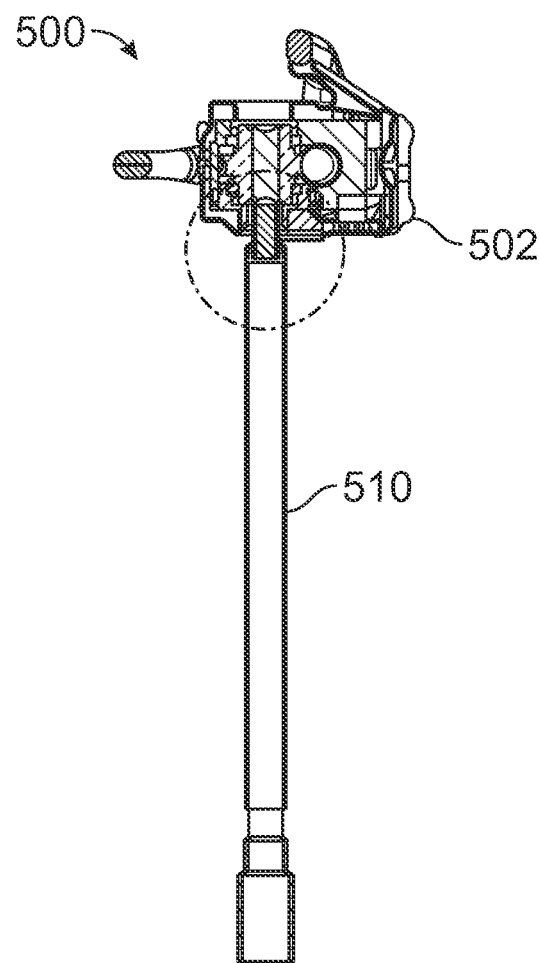
FIG. 5B is a cross-sectional side view of the valve operating device in FIG. 5A along cross-section B-B in FIG. 5A.
Figure 5C:
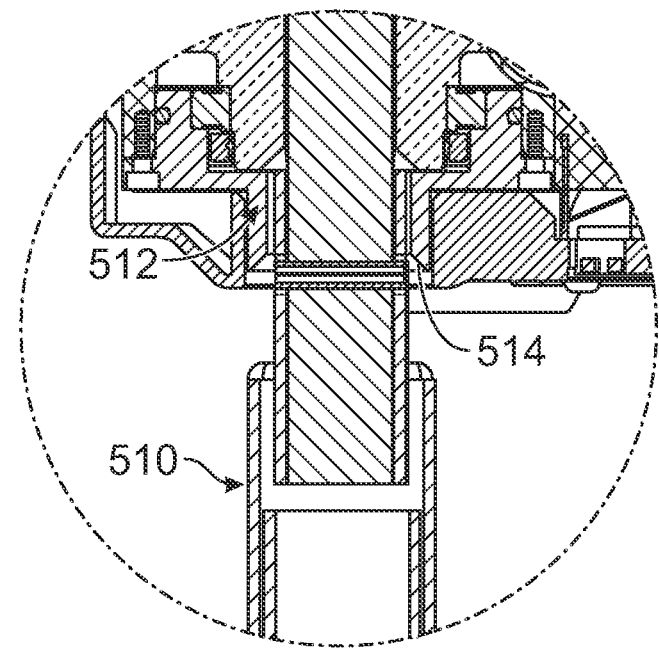
FIG. 5C is a cross-sectional view of detail C in the side view of FIG. 5B.

FIG. 5A is a front view of another example implementation of a valve operating device 500 connected to a valve turning key 510. FIG. 5B is a cross-sectional side view of the valve operating device 500 along cross-section B-B in FIG. 5A. The valve operating device 500 includes a housing 502 defining a transverse axis 501 extending from a first end 503 to a second end 503 of the housing 502. The valve operating device 500 includes a top carrying handle 540 and a front carrying handle 522. A first operator handle 506 extends from the first end 503 and a second operator handle 508 extends from the second end 505. FIG. 5C is a cross-sectional view of detail C in the side view of FIG. 5B illustrating an output socket 512 for receiving the key 510. The view in FIG. 5C shows a beveled edge 514 forming an inwardly directed cone section to guide the end of the key 510 into the output socket 512 as described in more detail below. FIG. 6A is a top view of the valve operating device in FIG. 5A. FIG. 6B is a zoomed in front view of the valve operating device 500.

Referring to FIGS. 5A-5C and 6A-6B, the housing 502 is configured to allow an operator to position the valve operating device 500 over the key 510, which is configured to mate with a valve opening or closing mechanism 108 of a valve 110 (see FIG. 1) to be tested. The operator positions the valve operating device 500 while viewing through a key opening 518 (in FIG. 6A) on a top surface of the housing 502. The key opening 518 provides a view to allow the operator to visually align the top of the key 510 with the output socket 512.

The output socket 512 is an entry way for the top of the key 510 to extend into the housing 502 to engage with a gearing mechanism as described in further detail below with reference to FIGS. 7A and 7B. The output socket 512 is formed with a beveled edge 514 forming an inwardly directed cone section. The inwardly directed cone section provides an opening with a greater cross sectional area than the top of the key 510. The inward cone formation guides the top of the key 510 into the output socket 512 as illustrated in FIG. 5C. The top of the key 510 enters into the housing 502 to engage with the gearing in the housing 502 as shown in FIG. 5B.

The housing 502 is provided with a top carrying handle 540 and a front carrying handle 522 to allow the operator to carry the valve operating device 500 from one place to another. The valve operating device 502 also includes a first operating handle 506 and a second operating handle 508 extending from the ends 503, 505 of the housing 502. The first operating handle 506 and the second operating handle 508 may be retractable within the housing 502. For example, the first and second operating handles 506, 508 may be at least partially inserted into the housing 502 substantially at 532 and released or extracted from the housing when the operator is ready to operate the valve operating device 500. In one example, the first and second handles 506, 508 may be released by actuating a pair of corresponding handle release mechanisms 528 (in FIG. 6A). The retractable operating handles 506 and 508 allow the operator to manually adjust a leverage along the transverse axis 501 by extending one handle more than the other handle. The adjustment of the leverage may be advantageous when the operator is attempting to manually turn the valve or when the operator is expecting a strong reaction force when operating in one direction or the other.

In example implementations, the housing 502 may be equipped with one or more warning lights 534. The warning lights 534 may be activated to light using a switch actuated by the user, or by operation or powering up of the valve operating device 500. The warning lights 534 are disposed at opposite ends 503, 505 of the housing 502 as shown in FIG. 6A. One or more warning lights 534 may be disposed on any suitable location on the housing 502. The warning lights 534 may also be implemented as static lights or flashing lights to provide a visual alert in the field to drivers or others in the vicinity of the operator that is using the valve operating device 500. Valves to be exercised may be located in locations that create hazards for the operator, such as intersections, roadsides, parking lots, etc. The warning lights 534 may make others aware that the operator is in their vicinity.

In an example implementation, the valve operating device 500 in FIGS. 5A-5B and 6A-6B may include a first motor activation switch 524 and a second motor activation switch 526. The motor activation switches 524, 526 described with reference to FIGS. 5A-5B, 6A-6B, and 7A-7B are referred to and described below as throttles, i.e. a first motor activation throttle 524 and a second motor activation throttle 526. It is to be understood however that any suitable switch type may be used. It is noted that the use of throttles for the motor activation switches advantageously allows a user to control the speed of the rotation of the key 510 during use.

The first and second motor activation throttles 524, 526 may be mounted on opposing ends of the housing 502. For example, the first motor activation throttle 524 may be mounted substantially at the first end 503 of the housing 502 and the second motor activation throttle 526 may be mounted substantially at the second end 505 of the housing 502. The first motor activation throttle 524 may be configured to control the speed of the motor (described below with reference to FIGS. 7A and 7B) to operate in a counter-clockwise or first direction. The second motor activation throttle 526 may be configured to control the speed of the motor to operate in a clockwise or second direction. It is to be understood however that the clockwise/counter-clockwise directions and the assignment of the directions to the motor activation throttles are used herein for purposes of simplifying the description of example implementations. Nothing in this description is intended to be limiting in any way. In an example implementation however, when configuring the first motor activation throttle 524 to operate in a counter-clockwise direction, the actuation of the first motor activation throttle 524 creates a reaction force that works to pull the first motor activation throttle 524 away from the operator's hand on the first motor activation switch 524. Similarly, the actuation of the second motor activation throttle 526 creates a reaction force that works to pull the second motor activation throttle 526 away from the operator's hand on the second motor activation switch 526. It is noted that if the motor activation throttle 524 or 526 is pulled away from the operator's hand, the operation of the motor may be configured to stop as a safety feature. By placing the motor activation throttles 524 and 526 on opposite sides, the operator is able to resist on both sides of the rotating key 510.

Another feature of having throttles 524, 526 mounted on opposite sides of the housing 502 is that the operator is not required to reverse positions relative to the valve operating device 500. In regular linear housing formations, the operator changes positions from one side of the key to a position 180 degrees away from the first position to operate the valve operating device in the opposite direction, or enlist the assistance of another operator. The valve operating device 500 allows for a single operator to maintain the valve operating device 500 stable when operating the device in both directions.

As described above, the top of the key 510 is inserted into the output socket 512 and guided by the beveled edge 514 of the output socket 512. The top of the key 510 extends into the housing 502 to couple with a gearing mechanism driven by a motor. The inner diameter of 514 aligns the centerline of the drive gear 600 with the centerline of key 510. This allows weight of the tool to be supported by the key 510 against the face of the drive gear 600 until a broach in the drive gear 600 aligns with the top of the key 510. In example implementations, the broach in the drive gear 600 may be an opening having a square or other suitable shape and the top of the key 510 may be shaped to match the broach.

One example implementation of a motor and drive system for controlling rotation of the key 510 is described below with reference to FIGS. 7A and 7B.

Figure 7B:
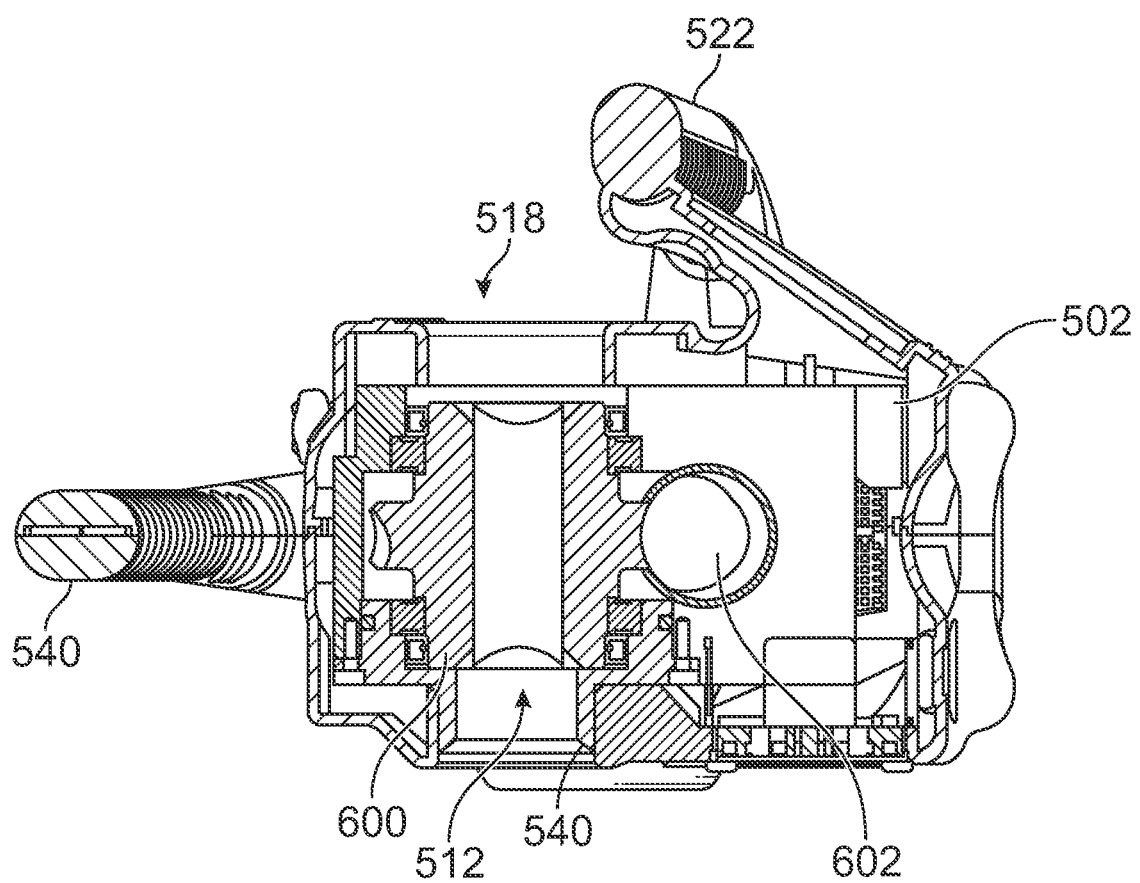
FIG. 7B is a side cross-sectional view of the valve operating device along section B-B in FIG. 6B.

FIG. 7A is a bottom cross-section view of the valve operating device in FIG. 6B along section A-A in FIG. 6B. FIG. 7B is a side cross-sectional view of the valve operating device along section B-B in FIG. 6B. The cross-sectional views in FIGS. 7A and 7B illustrate an example in which the housing 502 includes a motor 580, a motor shaft 582, a gear reduction mechanism 592, a first 602 configured to rotate in response to rotation of the drive shaft 582, and a second gear 600 engaged to rotate in response to rotation of the first gear. The second gear 600 is coupled to the top of the key 510 to rotate the key 510 in response to rotation of the second gear 600. In an example implementation, the gear reduction mechanism 592 may be implemented using a planetary gear system configured to drive the first gear 602 in response to rotation of the motor shaft 592, which turns when the motor 580 is activated to turn clockwise or counter-clockwise. In one example implementation, the motor 580 may be a brushless DC motor ("BLDC") configured to rotate the key 510 in a clockwise direction when the first motor activation throttle 524 is turned to an on-state. The operator may control the speed at which the key 510 turns by the extent to which the operator turns the throttle. The motor 580 may be configured to rotate the key 510 in a counter-clockwise direction when the second motor activation throttle 524 is turned to an on-state. It is noted that the direction of the key in the clockwise or counter-clockwise direction may be determined by the planetary gears 592, the first gear 602 and the second gear 600.

The second gear 600 may be mounted in one example in alignment with the view opening 518 that provides a view through the valve operating device 500 to the top of the key 510. The center of the gear 600 may be configured with an opening that is keyed to the shape of the top of the key 510 to provide an engagement between the gear 600 and the key 510. The view opening 518 and mechanism for engaging the valve operating device 500 to the key 510 may be disposed substantially in a center portion of the housing 502.

The operating handles 506, 508 on the ends of the housing 502, the output socket 512 for the key 510 disposed substantially in a central portion of the housing, and the mounting of the first and second motor activation throttles 524, 526 within easy reach of the handles generates a torque on opposite sides of the axis of rotation of the key 510. The operator is in a position to control the torque with one arm on each side providing the operator with stability in operating the valve operating device 500, particularly when the operator finds it necessary to switch directions of rotation in quick succession. This is particularly clear when an operator prefers to attempt to loosen a valve with manually generated power only.

In an example implementation, the first gear 602 and second gear 600 may be configured to self-lock when the motor is turned off so that the operator can turn the key 510 by rotating the valve operating device 500 manually by applying a pushing force on one of the handles 524, 526 while applying a pulling force on the opposite handle 526, 524. In one example, the first gear 602 is a worm portion of a worm gear set and the second gear 600 is a worm wheel portion of the worm gear set. If the worm drive ratio is made shallow, for example less than or equal to about 10 degrees in one example implementation, the friction forces in the manual turning of the device 500 with the worm wheel 600 engaged with the key 510 prevents the backdrive of the worm portion 600 of the worm gear set. The operator can then turn the device 500 in either direction to turn the key manually.

In other valve operating devices such as for example, the valve operating device 100 in FIGS. 1-4, the torque is generated on the base 115 extending from the axis of rotation of the key. If an operator wishes to manually force a valve to turn, the operator would need to add an extension bar to the end of the valve operating device 100 supporting the key. In some cases, this may need to be performed by another operator. When the motor of the valve operating device 100 turns the key, the operator can only resist the rotation of the device 100 by resisting the rotation of one end of the device.

It is to be understood that either of the first or second motor activation throttles 524 or 526 may be positioned anywhere on the housing 502 (in FIG. 6A). The first and second motor activation throttles 524 and 526 are shown positioned in FIGS. 5A and 6A near the ends 503, 505 of the housing to enhance the stability of the operator using the device 500 as described above. In addition, there is no limitation intended as to which side (right or left) is chosen for the mounting of the clockwise direction throttle and the counter-clockwise direction throttle.

Figure 8:
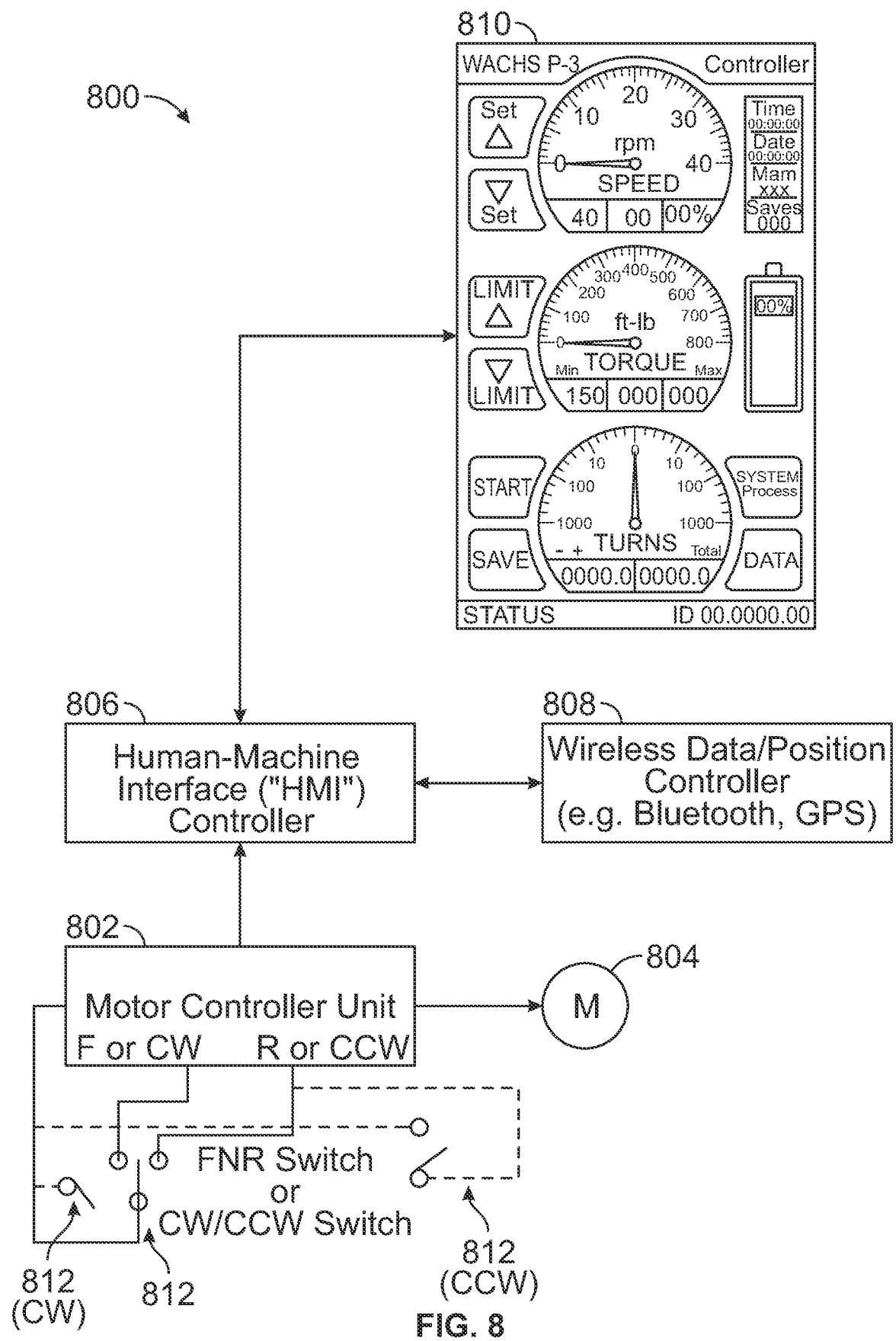
FIG. 8 is a schematic diagram of an example control system for using the example valve operating device.

FIG. 8 is a schematic diagram of an example control system 800 for using the example valve operating device 100. The control system 800 includes a motor controller unit 802, a human-machine interface controller 806, a data networking interface module 808, a display device 810, a motor activation switch (or, Forward-Neutral-Reverse (FNR) switch) 812, and a motor 804. The FNR switch may also be indicated as a clockwise (CW)/counter-clockwise (CCW) or CW/CCW switch. In an example implementation, the motor activation switch 812 may be implemented as two separate throttles, a first motor activation throttle 812(CW) and a second motor activation throttle 812(CCW). The description below refers to the FNR switch 812. It is to be understood that example implementations of the motor controller unit 800 may include the first motor activation throttle 812(CW) and the second motor activation throttle 812(CCW). The first motor activation throttle 812(CW) may be used to activate the motor 804 while controlling the speed in the clockwise direction. Similarly, the second motor activation throttle 812(CCW) may be used to activate the motor 804 while controlling the speed in the counter-clockwise direction. The first motor activation throttle 812 (CW) and the second motor activation throttle 812(CCW) may be implemented using any suitable control device that allows for a variable control of the speed at which the motor 804 is travelling in the corresponding direction. For example, the first and second motor activation throttles 812(CW) and 812(CCW) may be implemented using a variety of types of throttles. Examples of suitable throttles (without limitation) include thumb or twist hand type throttles. are the 2 generally used throttle hand types. Between thumb and twist hand type throttles, the thumb throttle may be preferred due to the operator's changing arm/body position as the operator works to provide the necessary CW/CCW reaction torque to actuated key 102. The operator's hand may grip the handle while the thumb independently moves to provide throttle response. The operation of the twist throttle is based on the operator's twist grip position which is likely to change more dramatically with changing body position due to reaction torque than the operator's thumb position when using the thumb hand type throttle.

The single motor activation switch (also referred to as a FNR switch) 812 may be implemented using any suitable three position switch. In an example implementation, the FNR switch 812 is a momentary switch. During operation, the operator presses either the forward or reverse side of the switch and holds the switch to maintain the motion of the motor 804.

The motor 804 may be any suitable motor that rotates at high torque sufficient for turning the valves to be exercised in a manner that permits the detection of the motor position and speed. In an example implementation, the motor 804 may be a brushless DC motor. However, any implementation is not limited to any specific motor. Any suitable motor that may be controlled in the manner described may be used.

The motor controller unit 802 may be any suitable controller for controlling the motor 804. The motor controller unit 802 may be provided as a single device, or as multiple devices configured to perform the functions used in operation. In an example implementation, the motor controller unit 802 is configured to drive the motor 804 at a set speed, provide signals or data to determine the speed of the motor 804, provide signals or data to determine the torque of the motor, and receive signals to set a speed, a maximum torque limit, and a direction of travel. In another implementation, the speed of the motor 804 may be controlled by a speed input, such as for example, a signal adjusted by the operator's activation of a throttle. The speed of the motor 804 by a throttle may be controlled up to a pre-defined, or set speed, threshold, or some other suitable limit. In example implementations, the motor controller unit 802 may be implemented using any suitable motor control system that provides control functions such as those described herein. The motor controller unit 802 is not limited to any specific motor controller system, device or scheme.

The human-machine interface controller 806 in FIG. 8 includes a processor, memory for on-device data and program storage, and an input/output system for communicating with the other modules in the system 800. The human-machine interface controller 806 drives the display device 810 to operate as a graphical user interface. The human-machine interface controller 806 includes program functions to provide display screens to the display device 810 and to receive user input from the selection of screen buttons on the display device 810.

The display device 810 may be any suitable LCD or LED display capable of implementation as a graphical user interface. In an example implementation, the display device 810 may be driven to display digital data in alphanumeric form, or images that mimic analog meters. The analog meter images may include an image of a needle against a scale. The display device 810 may then be driven to position the needle against the scale according to a value for which a measure is displayed. Button images may also be displayed to initiate functions as described below with reference to FIGS. 10-12.

It is noted that in some implementations, particularly in implementations that include first and second motor activation throttles 812(CW) and 812(CCW) for controlling the motor activation, the human-machine interface may be implemented without the use of a display device or with a human-machine interface controller 806 with all of the control features described herein. With respect to implementations that use motor activation throttles 812(CW) and 812(CCW) mounted in the manner described above with reference to the housing 802 in FIG. 6A, the orientation of the housing 502 and the manual speed control through the use of throttles 812 et. seq. enables the operator to control the valve operating device safely.

It is noted that in the example implementations described in this disclosure, the forward direction of the motor 804 shall be understood to mean motion of the motor 804 such that the key (510 for example) moves in the right hand, or clockwise direction. The reverse direction shall be understood to mean motion of the key in the left hand, or counter-clockwise direction. The forward direction shall also be understood to mean the direction for closing a valve and the reverse direction shall be understood to mean the opening of the valve. These conventions are not intended as limiting. Some valves may require turning clockwise to open and counter-clockwise to close. Furthermore, the motor 804 may need to turn clockwise to turn the key counter-clockwise, and vice versa, depending on the gearing in the drivetrain. These conventions are described solely for purposes of providing clarity to the description.

It is noted that in the description of control features below with reference to FIGS. 9A-9C through 12, a single switch (i.e. FNR) version of motor control is used as the motor activation switch 812. One of ordinary skill in the art would be able to implement any desired control features in a version that uses motor activation throttles. In some examples, the use of the motor activation throttles may be largely manual. A threshold speed and/or torque may be set. Speed and torque limits may be stored and communicated, if desired. However, the operation of the valves may be conducted without modulating speed leaving the speed largely up to the operator's control using the throttles.

Figure 9A:
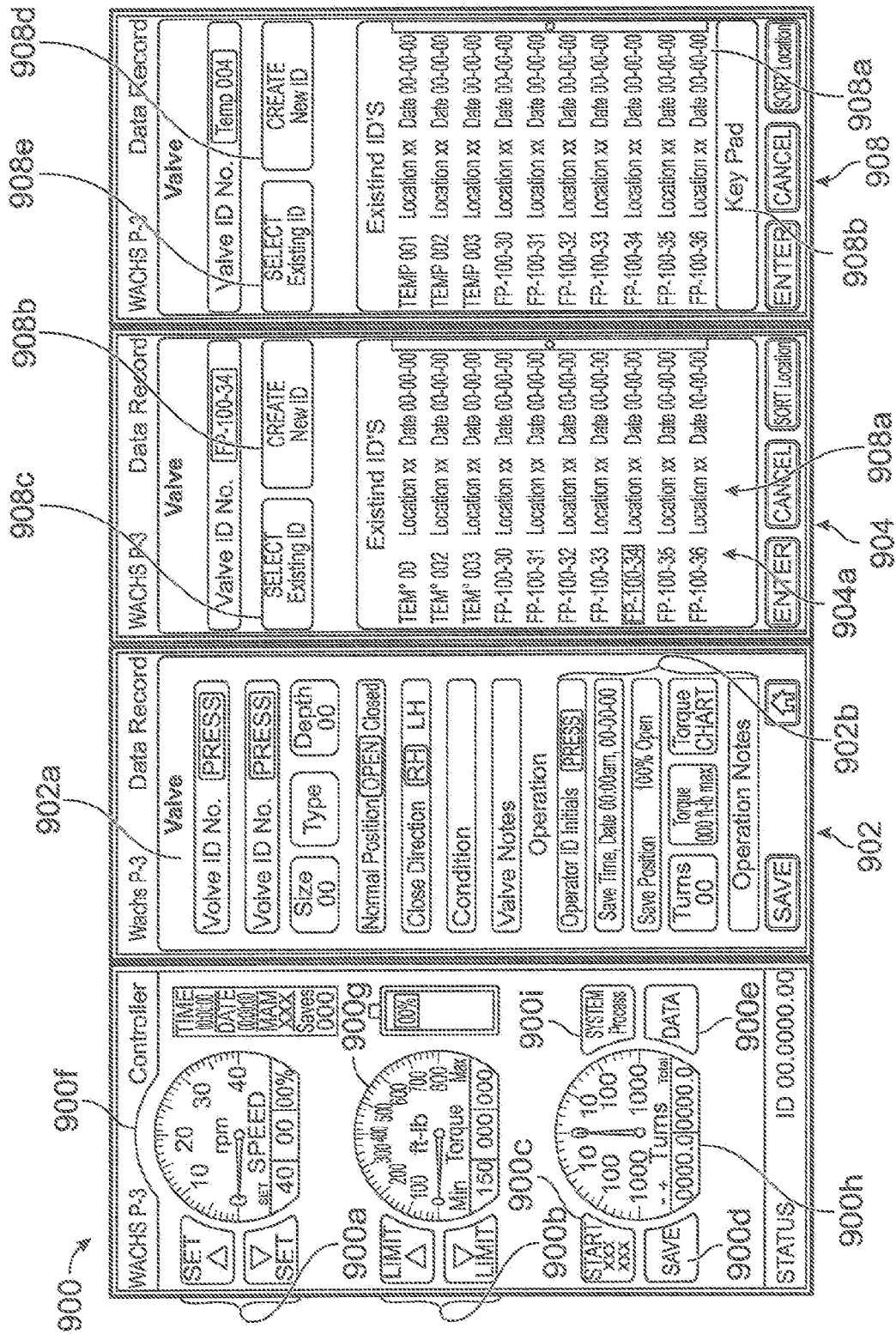
FIGS. 9A to 9B shows examples of display screens displayed during operation of the example valve operating device.
Figure 9B:
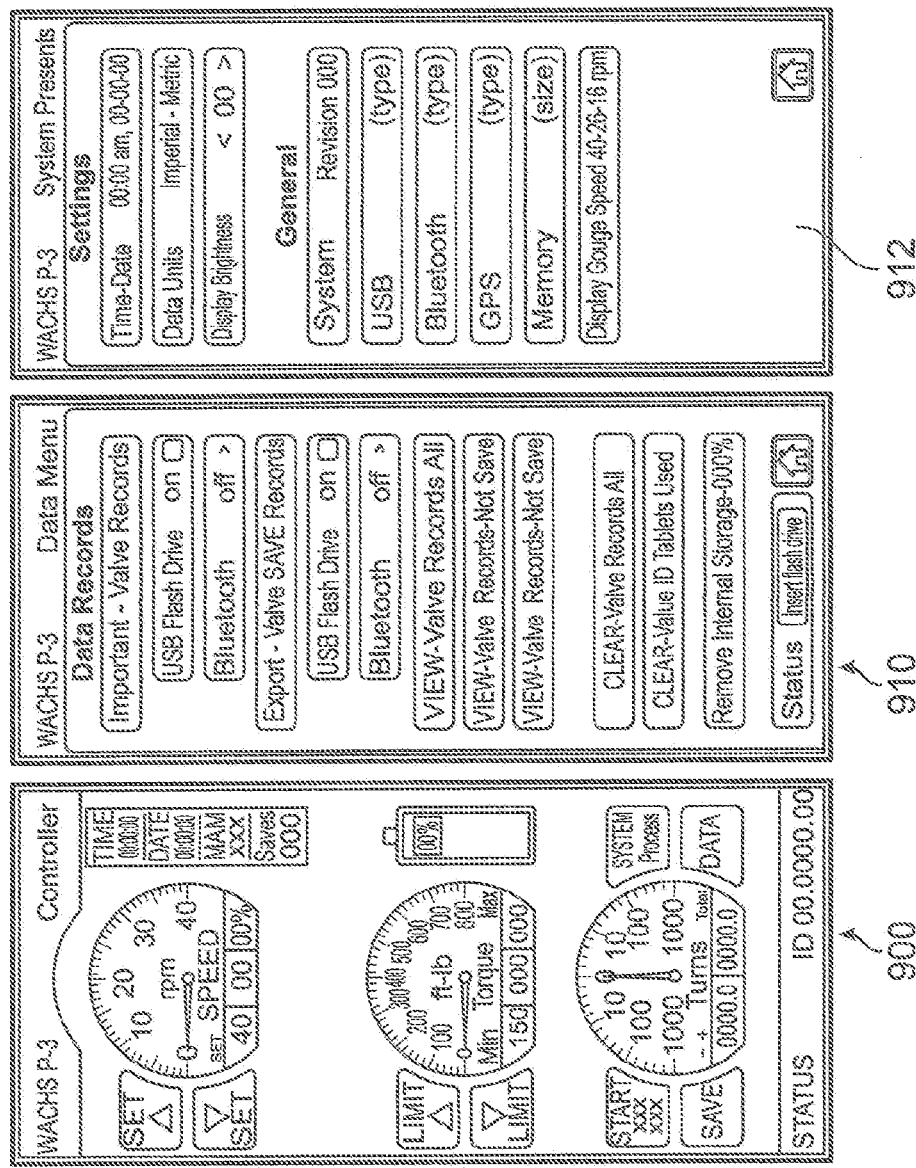

FIGS. 9A-9B illustrate examples of display screens displayed during operation of the example valve operating device 100. The display screens in FIG. 9A include a home control screen 900, a valve data records screen 902, a valve identifier screen 904, and a valve record creation screen 908. FIG. 9B includes the home control screen 900, a data records screen 910, and a system presets screen 912. The display screens in FIGS. 9A-9B provide a human-machine interface for example implementations of the valve operating device 100.

The home control screen 900 is the main screen used for operating the device. In an example implementation, the home control screen includes a pair of set speed screen buttons (indicated as up and down arrows) 900*a*, a pair of set torque limit screen buttons (indicated as up and down arrows) 900*b*, a START (labels on buttons in examples illustrated in FIG. 9A are capitalized for clarity and not intended to be limiting) screen button 900*c*, a SAVE screen button 900*d*, a DATA screen button 900*e*, a speed indicator section 900*f*, a torque indicator section 900*g*, a turns indicator function 900*h*, and a SYSTEMS PRESET screen button 900*i*.

The pair of set speed screen buttons 900*a* may be used by the operator prior to exercising a valve to set the speed at which the motor operates. In an example implementation, set speed screen buttons 900*a* include an up arrow button and a down arrow button. Speed values may be provided as several fixed speed values, such as for example, speeds in increments of 10 from 10 rpm to 40 rpm. In another example, the speeds may be adjusted in increments of 2 rpm between 4 and 40 rpm. Other example implementations may use other increments with different ranges. The pressing of the UP arrow button sets the speed to the next faster speed. Pressing the down arrow button sets the speed to the next slower speed value.

The pair of set torque limit screen buttons 900*b* may be used by the operator prior to exercising a valve to set the maximum torque limit for the torque delivered by the motor. In an example implementation, set torque limit screen buttons 900*b* include an up arrow button and a down arrow button. Torque limit values may be provided as falling in a range of torque values, such as for example, torque values in ranges of 0-100, -200, - . . . , -700, -800 ft/lbs. The pressing of the UP arrow button sets the maximum torque limit upward. Pressing the down arrow button sets the maximum torque limit downward.

The START screen button 900*c* may be pressed to initiate an exercise protocol for a valve. Pressing the START screen button 900*c* resets the current torque value and turns value to 0. As the valve is exercised, the current torque value, maximum torque value, and turns value are measured (and displayed). The values of the current torque value, maximum torque value, and turns value are part of the valve operations data record for the exercise of the valve.

In an example implementation, a default speed and torque setting may be specified to provide guided control of the valve exercise operation. When the valve exercise protocol is started, the speed and torque increase from zero to the designated default speed and torque setting. Guided control may further specify that a constant horsepower be maintained through the valve exercise operation. Accordingly, as the valve exercise operation proceeds, if the speed changes, the torque level is adjusted to maintain a constant horsepower.

In an example implementation, the valve operating device 100 may be configured to permit attachment of an extension rod to enable operation in a two-man mode. The home control screen 900 may include a 2-man mode switch 900*j* to enable a two-man mode. In the two-man mode, the default speed and torque settings may be higher, twice as high, for example, than the default settings for a normal one-man operation. To illustrate, in one example implementation, the default speed/torque settings may be a speed of 30 rpm and a torque of 100 ft-lbs, where the horsepower is set to a constant of 0.54 hp. The two-man mode when the 2-man mode switch 900*j* is enabled, may specify a default speed of 30 rpm and a torque of 200 ft lbs, where the horsepower is set to a constant of 1.09 HP. Different settings for default speed and torque, as well as a constant horsepower may be set differently for different implementations for either the one-man or the two-man modes. In one example implementations, the default settings for the one-man mode and/or the two-man mode may be set by an administrator as described below with reference to a systems presets display (not shown).

The operator can choose to save the valve operations data records as a result of the exercising of the valve, or the operator can decide that another test should be run. If the operator decides the latter, the operator presses the START screen button 900*c* to erase the results of the previous test.

In an example implementation, the SAVE screen button 900*d* may be selected to save the operations data records as data for a specific valve. In some implementations, when the operator presses the SAVE screen button 900*d*, the operator may be prompted by a screen (not shown) that requests an operator identifier. The prompt may be skipped if an operator identifier has previously been entered.

The valve identifier screen 904 may be displayed as part of the data save functions to identify a specific valve for which the valve operation data is to be stored. The valve identifier screen 904 provides the operator with existing valve identifiers from which to choose the valve for which an operation has been conducted. The valve identifier screen 904 also provides the operator with functions to create a new valve identifier if the operation has just been performed on a new valve.

The valve identifier screen 904 includes a valve list 904*a*, a create valve record button 904*b*, and a valve select screen button 904*c*. The valve list 904*a* lists each valve for which a valve record is entered. The valves may be listed by valve ID number, location, and date exercised. The valves in the valve list 904*a* may be selectable by pressing the valve identifier and pressing the valve select screen button 904*c*. The identifier data for any of the valves may be in memory on the device, on a USB drive, or on another computer. Pressing the valve select screen button 904*c* gathers the data by retrieving it from memory, whether it is on a USB drive or another computer via, for example, Bluetooth™. The operator may then press an enter screen button to select the valve for the valve exercise.

The create valve record button 904*b* may be used to create a valve record on-site. The operator presses the create valve record button 904*b* to display the valve record creation screen 908. The valve record creation screen 908 may include the valve list 908*a*, a keypad 908*b*, a select button 908*c* and a create button 908*d*. The operator may find that the desired valve record may already exist. If so, the operator may select the valve id in the valve list 908*a* and enter to select the valve. If the operator finds that a new valve record should be created, the keypad 908*a* is used to create a valve identifier. A location may be automatically provided by a GPS on the device 100. The date may also be automatically provided from the system date and time.

When a valve is selected from the valve identifier screen 904 or created from the create valve record screen 908, the valve identification data is displayed in the valve identifier section 902*a* of the valve data record screen 902. When the operator runs the valve exercise, the acquired operations records are associated with the valve identified in the valve identifier section 902a. It is possible for the operator to perform the valve exercise before obtaining the valve identification information. The valve operation data would then be associated with the valve selected by the user to be displayed in the valve identifier section 902a.

Once a valve identifier has been selected, or created, the valve operating device 100 displays the valve data records screen 902. The valve data records screen 902 may be divided into a valve identifier section 902a and a valve operation records section 902b. The valve identifier section 902a includes a form with data fields that contain identifying information about the valve being exercised. The type of information in the valve identifier section may include:
1. Valve identification number
2. Valve location (geographical)
3. Valve size
4. Valve type
5. Normal position (open or closed)
6. Direction to close (Right hand or Left hand)
7. Condition of the valve
8. Operator's notes A valve detail list including information that may be presented to the operator may be provided to permit the operator to choose specific information to display to the operator.

Much of the data displayed in the valve identifier section 902a may already be stored for the valve identified. The valve identifier section 902a may also permit the operator to view or to modify certain data elements. For example, the valve operation records section 902b includes data measurements obtained from exercising the valve and information relating to the measurement. The data measurements include turns and torque. A torque chart may be displayed when a TORQUE CHART button is pressed to display certain torque values at times of interest during the exercise, such as at the start and end of the turns in either direction, for example, or at selected time intervals during the exercise. In one example, the torque, speed and turns measurements may be saved as a function of time during the exercise. The data may then be used to display a graph illustrating the values changing during the valve exercise.

The information relating to the measurements may include the operator ID, the date and time of the exercise, the position (Open or Close) in which the valve was left, and operation notes left by the operator.

The operator may save the valve operation data acquired for the valve by pressing the SAVE screen button on the valve data record screen 902. In an example implementation described below with reference to FIGS. 10A-10C, a data save operation may only be permitted when valid data is entered in the valve ID, and location operator ID initials data field. The data in the data fields on the valve data record screen 902 may be verified when the SAVE screen button is pressed. The valve data record screen 902 may be maintained on the screen without saving data if a required field is not filled, or if a field is filled with invalid data. In some implementations, the fields may be checked for data without checking the validity of the data itself. When saved, the valve operation data would appear in the valve operation record section with the valve identification information in the valve identifier section when that valve is selected to appear in the valve data record screen 902. Pressing the START screen button 900c may erase the valve operation data for that valve and the operator can then run the valve exercise again.

The DATA screen button 900e displays the data records screen 910 when pressed by the operator. The data records screen 910 may be used by the operator to control what data is stored on the device 100 and to select data to view. The data records screen 910 also includes functions to clear memory. For example, the data records screen 910 may include a button to clear valve operation records (data acquired by exercising valves), valve identification records, or all records.

The data records screen 910 may include a function for importing valve records. A source may be selected, such as for example, USB drive, or Bluetooth™. A function may be provided to export valve operations records data. A destination may be selected, such as for example, a USB drive or Bluetooth™. The importing of valve records may be used to load the device with identifying data for valves that are to be exercised. The exporting of valve operations records data provides the results to a computer system that can perform further processing of the data.

The speed indicator section 900f of the home control screen 900 may display the current speed in real-time as a digital value or an analog display similar to a speedometer in an automobile, or both. The digital portion may display the speed of the turning valve as rpms and/or as a percentage of the maximum set speed. The maximum or set speed may be displayed for reference alongside the other digital values.

The torque indicator section 900g of the home control screen 900 may display the current torque applied to the valve in real-time as a digital value or an analog display or both. The torque may be displayed as a number of foot-lbs or a percentage of the maximum torque limit or both.

The turns indicator function 900h of the home control screen 900 may display the current number of turns traveled by the valve in real-time as a digital value or an analog display or both. The turns may be displayed digitally as a signed number to indicate direction, as a total number of turns, or both. The signed number may be used by the operator to determine the initial state of the valve as being closed, fully open, or partially open. For example, the operator may initiate a valve exercise and travel 80 turns on a valve that has a 100 turn range from close to open. The operator may have expected to proceed through 100 turns and reverse the direction of the motor to the other end of the range (open or close depending on the type of valve). The motor may travel 100 turns to close and end up with a value of −20 for a turn count. The operator may then determine that the valve was initially partially open by a fifth of fully open. The stopping of the valve at 80 turns would therefore be due to the valve being fully open rather than being obstructed.

The systems preset screen button 900i displays the systems preset data menu 912 when pressed. The system presets data menu 912 allows the operator to configure the device 100 by setting date and time (using a time and date settings screen (not shown)), preferred data units (metric or English for example), display brightness, and characteristics relating to components that are part of the device 100, such as for example, USB, software version, Bluetooth, GPS module, and memory.

The systems preset screen 912 may also include an administrator selector to allow a privileged operator to modify default settings for speed and torque. When selected, the administrator function may present an administrator screen (not shown). The operator may be prompted for an administrator password, which when properly entered, allows the operator to make changes to default settings. The default settings may be listed in a selectable settings list. The settings list may include default speed and torque settings for a 1-man mode and default speed and torque settings for a 2-man mode. The display screen with the settings list 915a may include graphical user interface elements to enable the operator to change the values for each setting. The administrator screen provides a way for an operator to modify the default speed and torque settings and other settings that may be deemed to require secure access to enable modification. Default speed and torque settings may affect the safety of the valve operating device 100 making it advantageous to require a secure access.

FIGS. 10A-10C, and 11-12 are flowcharts illustrating user interface operation of the example valve operating device 100 (in FIG. 1). Any reference to the device in the description of the flowcharts in FIGS. 10A-10C, and 11-9 shall be to the valve operating device 100 in FIG. 1 unless otherwise indicated. The flowcharts in FIGS. 10A-10C, and 11-9 illustrate operation of the device 100 in the context of its use by an operator.

Figure 10A:
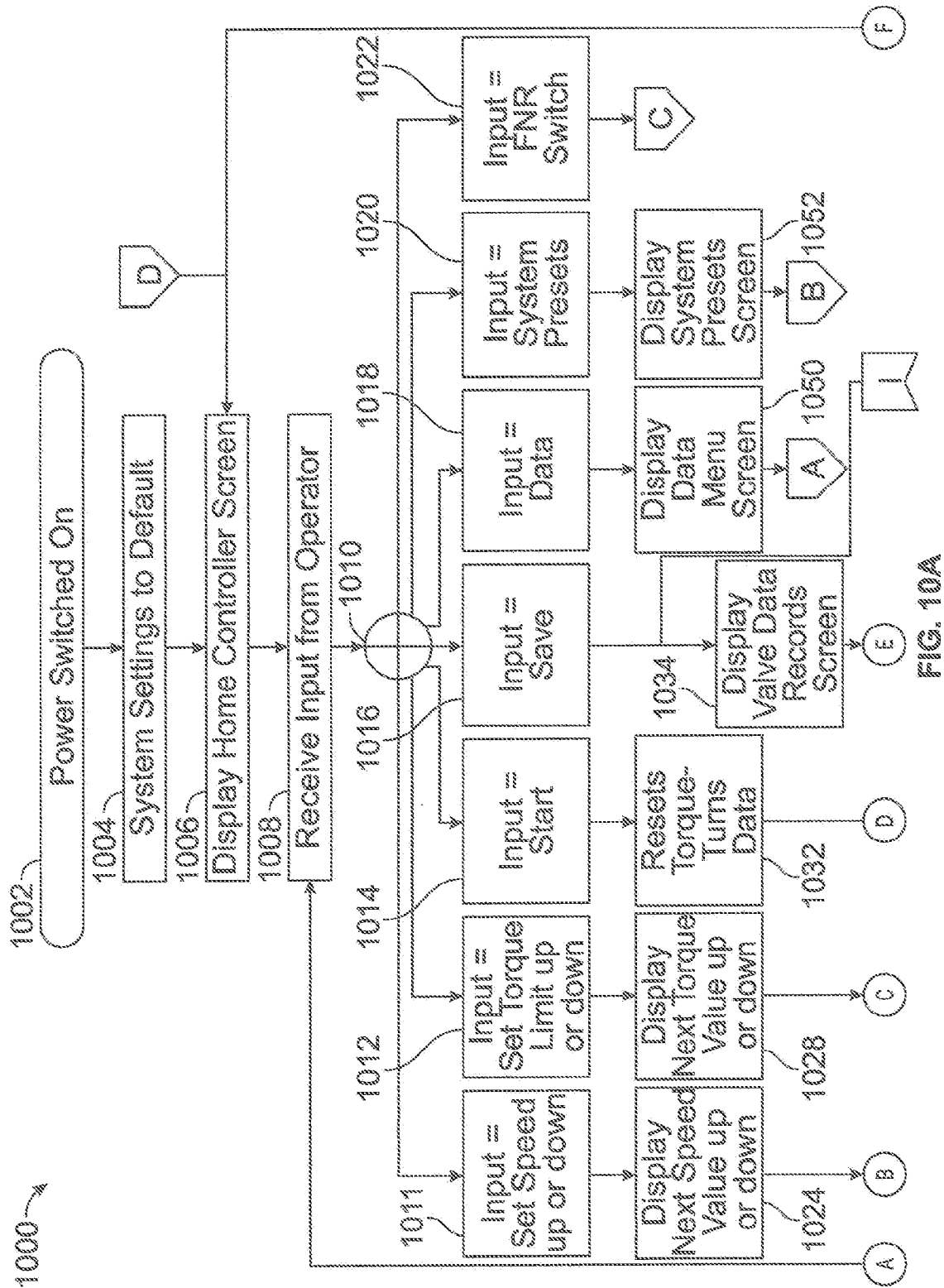
FIGS. 10A-10C, and 11-12 are flowcharts illustrating user interface operation of the example valve operating device.
Figure 10B:
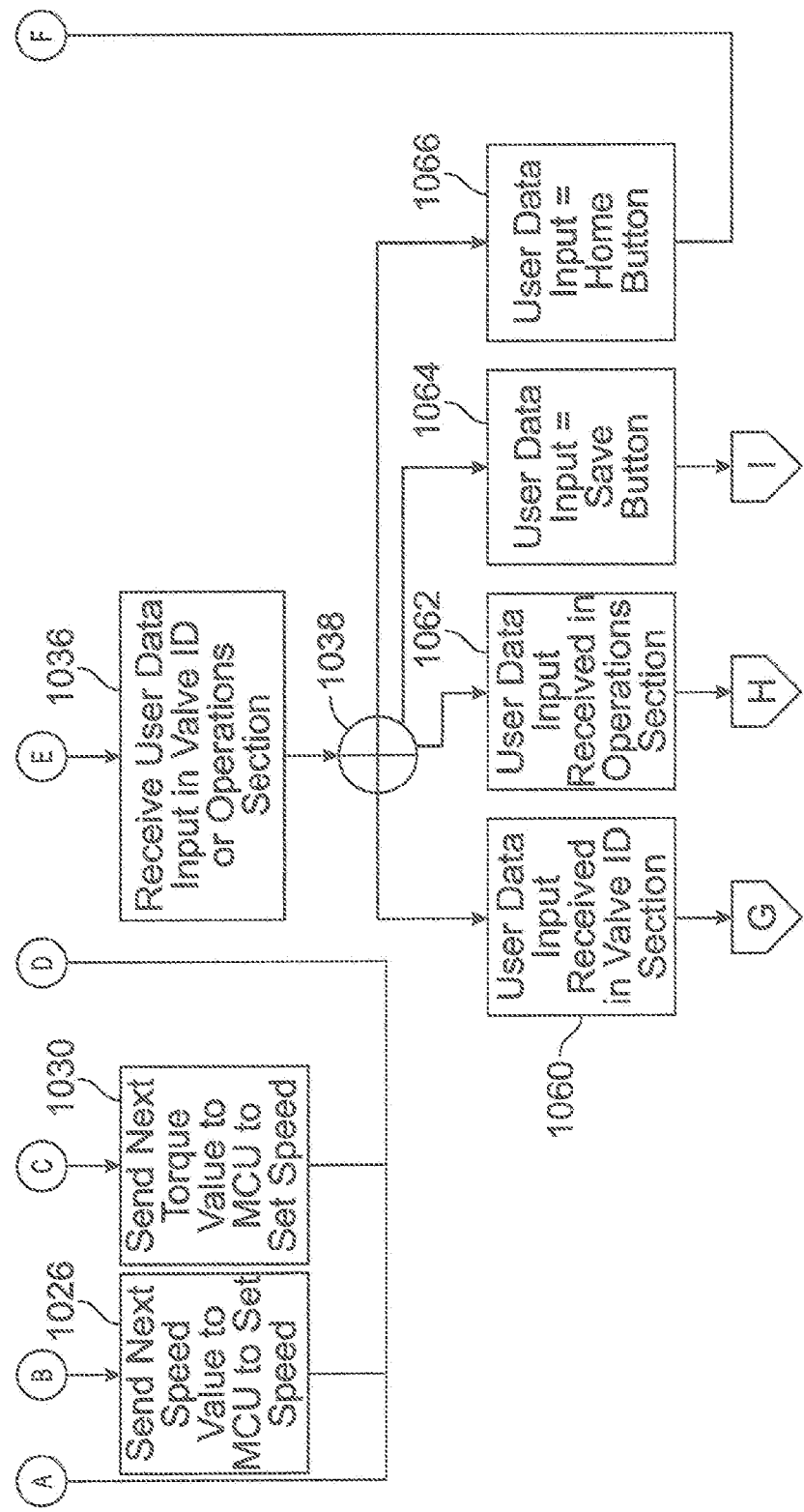
Figure 10C:
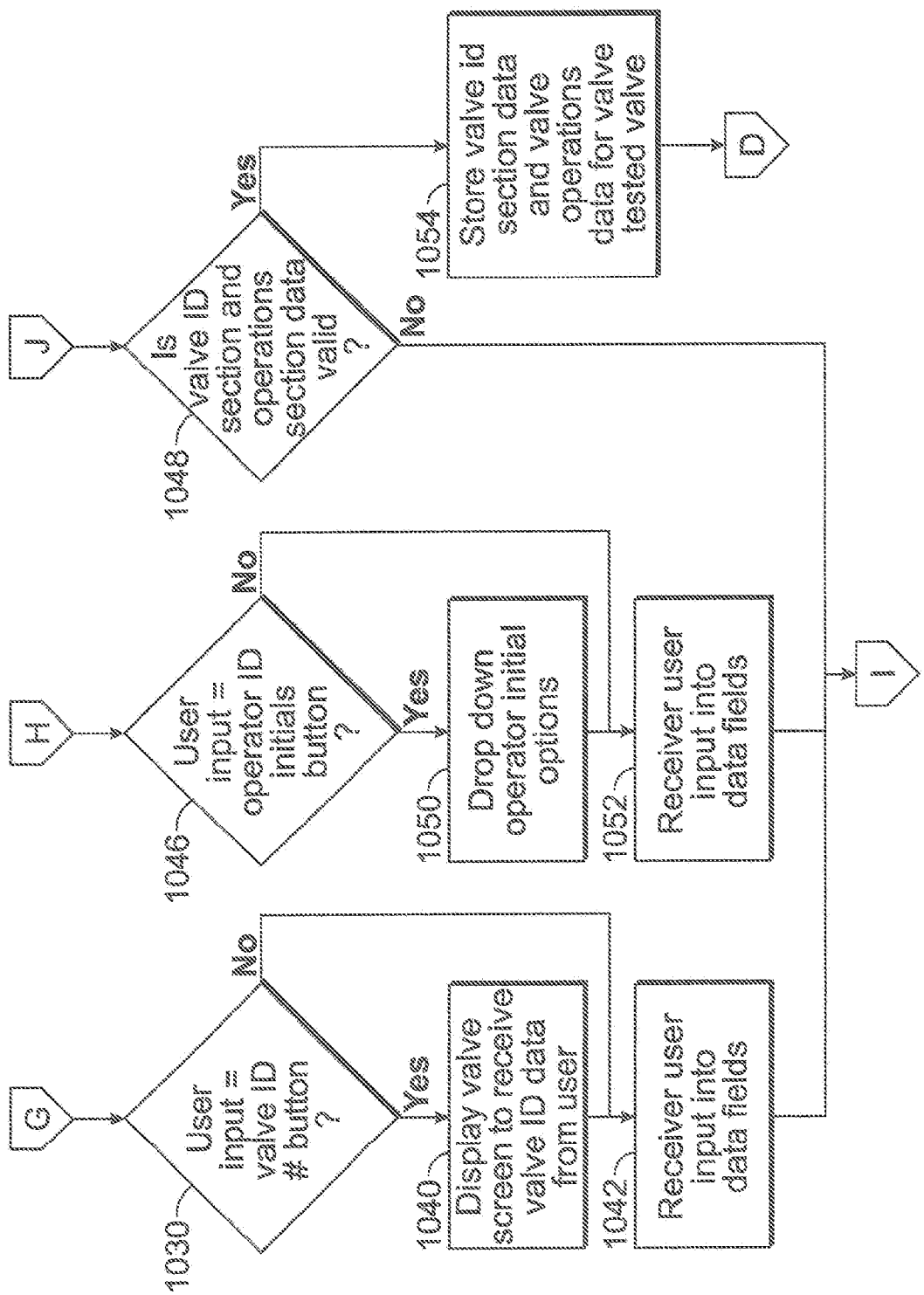

The flowchart 1000 in FIGS. 10A-10C illustrates operation of the device 100 starting with turning on the power to the device at step 1002. At power-up, the system settings of the device are set to a default state at step 1004. The default settings may be involve clearing the memory of data records, default system presets or the last modified system presets, or to an predetermined automatic state. At step 1006, the home control screen is displayed on the display device. The system software may then wait for a user input. At step 1008, user input is received from the operator. The user input may be one of several user inputs available on the home control screen as indicated by the OR operator 1010.

The user input at step 1011 may be either the set speed up or down arrows. The speed up or speed down arrows may typically be pressed while the valve operating device 100 is in operation. At step 1024, the speed selected is set to and displayed as the next speed up or down depending on the arrow pressed. At step 1026 in FIG. 10B, the speed setting is provided to the motor controller unit to drive the motor at the selected speed. Control returns to step 1008 after each press of the arrow up or arrow down keys.

At step 1012, the user pressed the torque limit up or down arrows. The torque adjustment arrows may be pressed by the operator during operation of the valve operating device 100. At step 1028, the next torque level up or down, depending on the arrow pressed is set to and displayed as the maximum limit of torque to be generated by the motor in the next operation of the motor. At step 1030 in FIG. 10B, the set torque is provided to the motor controller unit to limit the torque applied during the next operation of the motor. Control returns to step 1008 after each press of the arrow up or arrow down keys.

It is noted that during an adjustment of speed by the operator during operation the valve operating device 100, the torque may need to be automatically adjusted to keep the horsepower constant. Similarly, an adjustment of torque by the operator during operation the valve operating device 100, the speed may need to be automatically adjusted, also to keep the horsepower constant. The adjustment of the speed or torque may be performed by software as described with reference to FIG. 9A below using the well-known horsepower relationship:

$$HP = Speed(rpm) \times Torque\ (ft\text{-}lb)/5252.$$

At step 1014, the user pressed the START screen button on the home control screen. At step 1032, the valve operations record, or the data that was most recently acquired by running the valve exercise are reset to an initial value (typically zero, depending on the parameter). Control then returns to step 1008.

At step 1015, the user pressed the SAVE screen button on the home control screen. At step 1016 in FIG. 10B, the human machine interface of the valve operating device 100 may request the operator to enter an operator identifier. This step may be skipped if an operator identifier has previously been entered. The valve identifiers screen 904 (in FIG. 9A) may then be displayed at step 1034 to allow the operator to select or create a valve identifier. The operator may either select an existing valve identifier or create a new one. The display may then transition to the valve data records screen 902 as described above with reference to the screens in FIGS. 9A and 9B.

The valve data records screen 902 provides the operator with a display of the operations data from the last valve exercise performed and information about the valve itself. The display may permit the operator to add data or modify data as described above with reference to FIGS. 9A-9B.

As indicated by OR operator 1038, the user input received from the valve data records screen may also be from the valve data record screen SAVE button at 1064, or a valve data record screen HOME button at 1066. The operator may wish to repeat the test upon viewing the operations data displayed in the valve operations section 902b (FIG. 9A). The operator may then wish to repeat the valve exercise. The operator may press the HOME screen button in the valve data records screen to go back to the home screen without saving data.

If however, the operator decides the operations data from the most recent valve exercise should be saved, the user input at OR operator 1038 may be a press of the SAVE screen button at step 1064. At decision block 1048 in FIG. 10C, the data in the valve ID section and in the valve operations section may be checked to determine if the data is present in the data fields. If certain data in either section is not present or not valid (NO path), the valve data records screen is maintained on the display waiting for user input. In an example implementation, the system may require that any or all of an operator ID, a valve ID, a valve location, or a date and time be entered. In one implementation, an error popup message may be displayed if any data is missing. The data may also be checked for validity based on any suitable standard of validity for the data entered in the valve ID section.

If at decision block 1048, the data in the valve ID section and the valve operations section is valid, or at least present, the valve id section data and the valve operations section data is stored for later analysis at step 1054. When the data in the valve data records screen is saved, control may return to the home control screen at step 1006.

Figure 11:
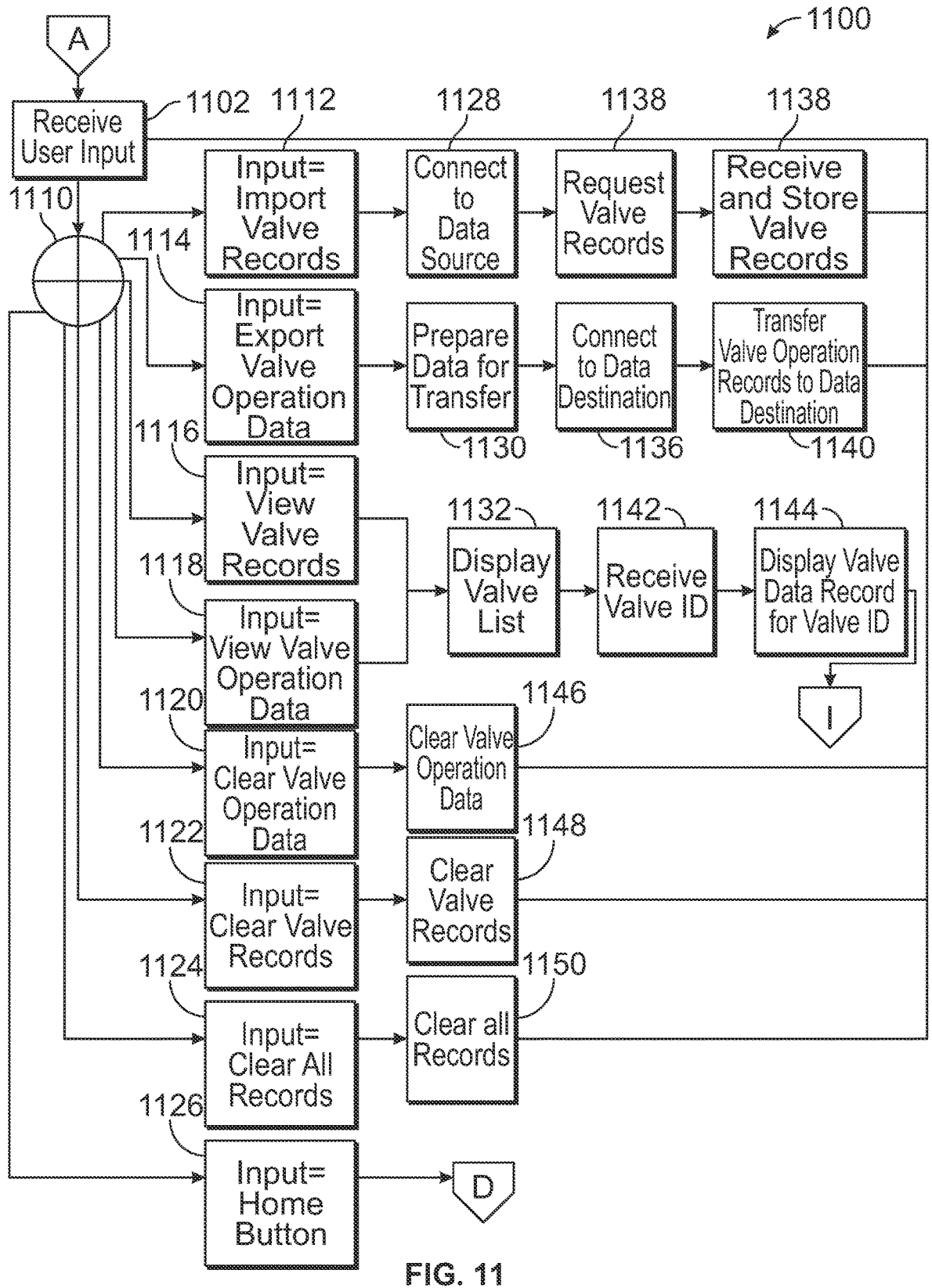

At the home control screen, the user may press the DATA screen button at step 1018. At step 1050, the data menu screen 910 (in FIG. 9B) is displayed on the display device. Referring to FIG. 11, the system software waits for user input at step 1102. Multiple user inputs may be received at step 1102 as indicated by the OR function 1110. At step 1112, the user input is a press of the import valve records button (see 910 FIG. 9B). At step 1128, a data connection is made to the selected source for importing the data. The data source in one example implementation may be a USB connection, which may have a USB drive or a USB cable connection to another device. The selected source may be another device connected by Bluetooth. At step 1134, a communications protocol may be performed to request valve records from the source. At step 1138, the valve records are received and stored. Control then returns to step 1102.

At step 1114, the user input was the press of the export valve operations data, which may include both valve operation records data acquired during a valve exercise and valve identification data. At step 1130, the data is prepared for transfer. At 1136, a data connection is made to the selected destination, which again, in an example implementation may be a USB connection or a Bluetooth connection. At step 1140, the vehicle operations data is transferred to the selected destination. Control then returns to step 1102, At step 1116, the user input a press of the view valve records button and at step 1118, the user input a press of the view valve operations data button. At step 1132, either the valve identifier data or the valve operations data or both may be displayed using the valve identifier screen. At step 1142, the user input for the valve identifier section is received. At step 1144, the valve data record screen for the selected valve identifier is displayed. Control then proceeds to decision block 1034 to process the user inputs at the valve data record screen.

At step 1120, the user input a press of the clear valve operations data button. At step 1146, the valve operations data, which is the data acquired during valve exercise, is cleared from memory. Control then returns to step 1102.

At step 1122, the user input a press of the clear valve records button. At step 1148, the valve data, which may include the valve identifier data, as well as data acquired during valve exercise, is cleared from memory. Control then returns to step 1102.

At step 1124, the user input a press of the clear all records button. At step 1150, all valve records data is cleared from memory. Control then returns to step 1102.

At step 1126, the user input is the press of the home button. Control then returns to step 1008 in FIG. 10A.

Figure 12:
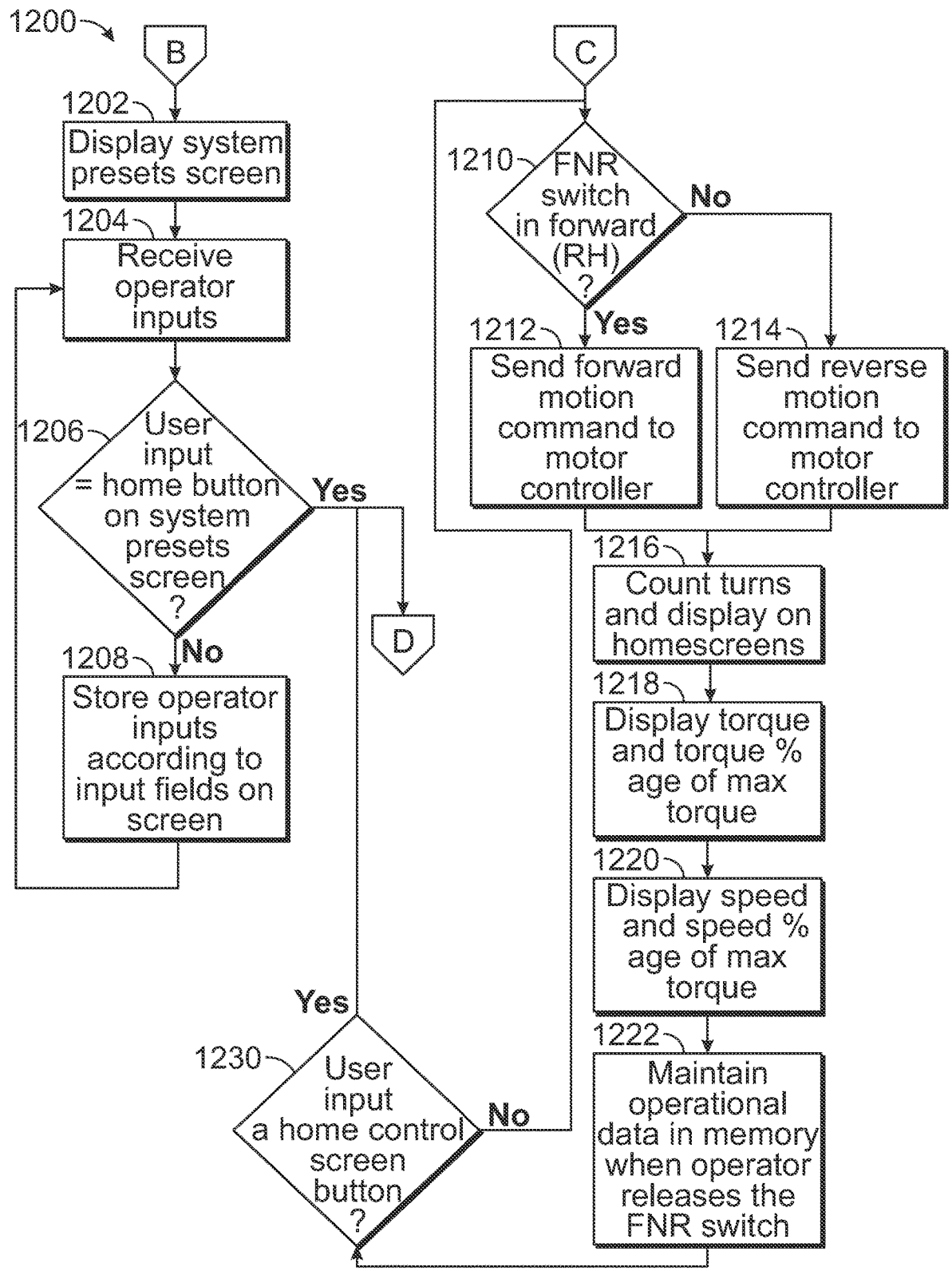

Referring back to FIG. 10A, at step 1020, the user pressed the system presets button. Referring to FIG. 12, at step 1202, the system presets screen is displayed (see 912 in FIG. 9B). At step 1204, a user input is received.

Decision block 1206 determines if the user input is the press of the home button on the system presets screen. If the user pressed the home button ('YES' path), control returns to step 1008 in FIG. 10A. If the user entered data relating to the displayed system presets ('NO' path), the operator inputs are stored according to the input fields on the screen. For example, the user input in the system presets screen may relate to setting date and time, preferred data units (metric or English for example), display brightness, and characteristics relating to components that are part of the device 100, such as for example, USB, software version, Bluetooth, GPS module, and memory. Control then returns to step 1204.

Returning to FIG. 10A, at step 1022, the user input was the pressing and holding until the operator lets go of the FNR switch or one of the two motor activation switches (812(CW) or 812(CCW) for example). Referring to FIG. 12, decision block 1210 checks if the motor 804 is operated in the clockwise or forward direction. If the operator selects motion in the forward direction ('YES' path), the motor controller unit is commanded to drive the motor in the forward direction at step 1212. If the reverse direction was selected ('NO' path of decision block 1210), the motor controller unit is commanded to drive the motor in the reverse direction at step 1214.

At step 1216, as the motor is moving, the turns are counted and displayed on the turn indicator display on the home control screen. The turn count may be displayed as a signed number to indicate direction or as a total number, or both. The turn count may also be indicated using an analog display format. The torque and torque as a percentage of max torque limit may be displayed on the torque indicator display on the home control screen. The speed and speed as a percentage of maximum set speed may be displayed on the speed indicator display on the home control screen. It is noted that step 1216 may be performed continuously as long as the motor is moving. It is further noted that the operator may release the FNR switch in one direction and press the FNR switch to move the motor in the opposite direction. In the example in which the motor control relies on the first motor activation switch 812(CW) and the second motor activation switch 812(CCW), the operator may be pressing one of the two switches (812(CW) or 812(CCW)) to drive the motor in the selected direction and then release the switch to then press the other motor activation switch (812(CCW) or 812(CW)). The switching of directions in which the motor is driven may be performed for example, if the valve resists due to deposits or dirt or rust that has accumulated over time. The operator may reverse the motor for a short period of time, then reverse the direction of the motor again to free the valve. Each time the motor stops, for example, when the operator releases the FNR switch or one of the two switches 812(CW) or 812(CCW), the operational record data, which includes at least the speed, torque and turn parameters described with respect to step 1216, may be logged, or maintained in memory to indicate the result of the test until the operator has concluded the valve exercise.

At step 1218, the torque and torque percentage of max torque may be displayed. At step 1220, the speed and speed percentage of max speed may also be displayed. the operator may have pressed a speed or torque control input (at steps 1011 and 1012 in FIG. 10A). If the operator has adjusted speed or torque, speed or torque may be adjusted to maintain a constant horsepower. At step 1222, operational data is maintained and constantly updated in memory as the valves are exercised, and then stored in memory when the operator has released the motor activation switch(es) 812 or 812(CW)/812(CCW). If the operator has not pressed another screen button but rather is continuing to exercise the valve in an opposite direction, control returns to decision block 1210. If decision block 1230 determines that the operator has pressed another screen button on the home control screen, control returns to step 1008 in FIG. 10A.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:
1. A valve operating device comprising:
  a housing defining a transverse axis extending from a first end thereof to a second end thereof;
  a motor disposed within the housing, the motor having a motor output shaft configured to drive at least one gear disposed within the housing, where the at least one gear is configured to rotate a key extending substantially perpendicular to the transverse axis to engage a valve;
  a motor controller unit configured to drive the motor in either a clockwise or a counter-clockwise direction at a variable motor speed to deliver up to a torque limit;
  a user interface comprising a first motor activation throttle configured to drive the motor in the clockwise direction at a user-controlled speed when activated and a second motor activation throttle configured to drive the motor at a user-controlled speed in the counter-clockwise direction when activated; and a first handle formed on the first end of the housing and a second handle formed on the second end of the housing, where the first motor activation throttle is mounted on the first end of the housing and the second motor activation throttle is mounted on the second end of the housing, and where the first motor activation throttle is mounted in proximity to the first handle and the second motor activation throttle is mounted in proximity to the second handle.

2. The valve operating device of claim 1 further comprising:

an output socket disposed between the first end and the second end of the housing, and configured to receive an end of the key for engagement with the at least one gear.

3. The valve operating device of claim 2 where the housing includes a key opening substantially aligned with the output socket and extending to a top surface of the housing, the key opening provides a view for an operator in aligning the key to the output socket.

4. The valve operating device of claim 2 where the output socket includes a beveled edge at a receiving end of the output socket, the beveled edge forming an inwardly directed cone section, where the beveled edge substantially guides the end of the key to align the end of the key with the at least one gear when the key is inserted into the output socket.

5. The valve operating device of claim 2 where the output socket is disposed substantially in a central portion of the housing.

6. The valve operating device of claim 1 where the first handle is mounted on a side of the housing at which the first motor activation throttle creates a reaction force that pulls the first handle away from a hand of the user holding the first handle when the user operates the first motor activation throttle.

7. The valve operating device of claim 1 where the second handle is mounted on a side of the housing at which the second motor activation throttle creates a reaction force that pulls the second handle away from a hand of the user holding the second handle when the user operates the second motor activation throttle.

8. The valve operating device of claim 1 where:

the first handle is configured to extend outward to an extended state from a first handle space disposed in the first end of the housing to receive the first handle in a non-extended state, and the second handle is configured to extend outward to an extended state from a second handle space disposed in the second end of the housing to receive the second handle in a non-extended state.

9. The valve operating device of claim 2 where the at least one gear includes a first gear and a second gear:

the motor is mounted within the housing between the output socket and either the first end or the second end of the housing;

a motor drive shaft extends from the motor to engage with the first gear; and the first gear engages to rotate the second gear, where the second gear engages with the key when the key is inserted in the output socket such that the key rotates in response to rotation of the second gear.

10. The valve operating device of claim 9 where the first gear is a worm portion of a worm gear set and the second gear is a worm wheel portion of the worm gear set, where the worm wheel includes a key opening to engage with the key when the key is inserted into the key opening.

11. The valve operating device of claim 10 where the motor drive shaft is coupled to the motor and the worm gear via a planetary gear system configured to adjust a gear ratio of the worm gear and worm wheel.

12. The valve operating device of claim 10 where the motor engages with the worm gear set to rotatably lock when the motor is switched to an off-state such that the operator is permitted to turn the key by manual rotation of the housing using a pair of handles mounted on opposite ends of the housing.

13. The valve operating device of claim 10 further comprising:

a battery removably mounted between the output socket and the other one of the second end or the first end opposite the motor.

14. The valve operating device of claim 1 further comprising at least one warning light mounted on the valve operating device to flash a light when the valve operating device is being used.

15. The valve operating device of claim 14 where the at least one warning light includes a first warning light mounted in proximity to the first end of the housing and a second warning light mounted in proximity to the second end of the housing.

16. The valve operating device of claim 15 further comprising a first handle extending from the first end of the housing and a second handle extending from the other end of the housing, where the first warning light is mounted on the first handle and the second warning light is mounted on the second handle.

17. The valve operating device of claim 1 where the user interface comprises:

at least one button;

at least one display device;

where the display device is configured to display at least one of the following:

turns of the key, current torque, torque limit, battery charge level, or a set speed limit value; where the operator uses the at least one button to perform at least one of the following:

reset the turns of the key, or set a torque limit.

18. The valve operating device of claim 1 where the user interface comprises:

at least one button;

at least one display device;

where the display device is configured to display a set torque limit value where the operator adjusts the set torque limit value using the at least one button.

19. A valve operating device comprising:

a housing defining a transverse axis extending from a first end thereof to a second end thereof;

a motor disposed within the housing, the motor having a motor output shaft configured to drive a first gear and a second gear disposed within the housing, where at least one gear is configured to rotate a key extending substantially perpendicular to the transverse axis to engage a valve;

a motor controller unit configured to drive the motor in either a clockwise or a counter-clockwise direction at a variable motor speed to deliver up to a torque limit;

a user interface comprising a first motor activation throttle configured to drive the motor in the clockwise direction at a user-controlled speed when activated and a second motor activation throttle configured to drive the motor at a user-controlled speed in the counter-clockwise direction when activated; and an output socket disposed between the first end and the second end of the housing, and configured to receive an end of the key for engagement with at least one gear, where the first gear is a worm portion of a worm gear set and the second gear is a worm wheel portion of the worm gear set, and where the worm wheel includes a key opening to engage with the key when the key is inserted into the key opening.

20. A valve operating device comprising:

a housing defining a transverse axis extending from a first end thereof to a second end thereof;

a motor disposed within the housing, the motor having a motor output shaft configured to drive at least one gear disposed within the housing, where the at least one gear is configured to rotate a key extending substantially perpendicular to the transverse axis to engage a valve;

a motor controller unit configured to drive the motor in either a clockwise or a counter-clockwise direction at a variable motor speed to deliver up to a torque limit;

a user interface comprising a first motor activation throttle configured to drive the motor in the clockwise direction at a user-controlled speed when activated and a second motor activation throttle configured to drive the motor at a user-controlled speed in the counter-clockwise direction when activated; and an output socket disposed between the first end and the second end of the housing, and configured to receive an end of the key for engagement with the at least one gear, where the housing includes a key opening substantially aligned with the output socket and extending to a top surface of the housing, and where the key opening provides a view for an operator in aligning the key to the output socket.

\* \* \* \* \*